(12) United States Patent
Hughes et al.

(10) Patent No.: US 12,026,615 B2
(45) Date of Patent: Jul. 2, 2024

(54) TRAINING OF PHOTONIC NEURAL NETWORKS THROUGH IN SITU BACKPROPAGATION

(71) Applicant: The Board of Trustees of the Leland Stanford Junior University, Stanford, CA (US)

(72) Inventors: Tyler William Hughes, Stanford, CA (US); Momchil Minkov, Stanford, CA (US); Ian Williamson, Stanford, CA (US); Shanhui Fan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 875 days.

(21) Appl. No.: 17/054,125

(22) PCT Filed: May 10, 2019

(86) PCT No.: PCT/US2019/031747
§ 371 (c)(1),
(2) Date: Nov. 9, 2020

(87) PCT Pub. No.: WO2019/217835
PCT Pub. Date: Nov. 14, 2019

(65) Prior Publication Data
US 2021/0192342 A1 Jun. 24, 2021

Related U.S. Application Data

(60) Provisional application No. 62/669,899, filed on May 10, 2018, provisional application No. 62/783,992, filed on Dec. 21, 2018.

(51) Int. Cl.
*G06N 3/08* (2023.01)
*G02B 6/293* (2006.01)
*G06N 3/063* (2023.01)

(52) U.S. Cl.
CPC ............. *G06N 3/08* (2013.01); *G02B 6/2935* (2013.01); *G06N 3/063* (2013.01)

(58) Field of Classification Search
CPC ......... G06N 3/08; G06N 3/063; G02B 6/2935
See application file for complete search history.

(56) References Cited

U.S. PATENT DOCUMENTS 5,244,818 A * 9/1993 Jokerst ............... H01L 27/14687
148/DIG. 135
5,428,710 A * 6/1995 Toomarian ............... G06N 3/08
706/25

(Continued)

FOREIGN PATENT DOCUMENTS

EP      0502943 B1   2/1999
EP      1255157 A1   11/2002

(Continued)

OTHER PUBLICATIONS

Notes on Adjoint Methods for 18.335 (Year: 2012).*

(Continued)

*Primary Examiner* — Shahid K Khan
(74) *Attorney, Agent, or Firm* — KPPB LLP

(57) ABSTRACT

Systems and methods for training photonic neural networks in accordance with embodiments of the invention are illustrated. One embodiment includes a method for training a set of one or more optical interference units (OIUs) of a photonic artificial neural network (ANN), wherein the method includes calculating a loss for an original input to the photonic ANN, computing an adjoint input based on the calculated loss, measuring intensities for a set of one or more phase shifters in the set of OIUs when the computed adjoint input and the original input are interfered with each other within the set of OIUs, computing a gradient from the (Continued)

measured intensities, and tuning phase shifters of the OIU based on the computed gradient.

17 Claims, 9 Drawing Sheets

(56) References Cited

U.S. PATENT DOCUMENTS

| | | | |
|---|---|---|---|
| 6,374,385 | B1 | 4/2002 | Hamalainen et al. |
| 10,268,232 | B2 | 4/2019 | Harris et al. |
| 11,460,753 | B2 | 10/2022 | Hughes et al. |
| 11,796,794 | B2 | 10/2023 | Fan et al. |
| 2004/0107172 | A1 | 6/2004 | Wang |
| 2007/0047966 | A1 | 3/2007 | Hironishi et al. |
| 2008/0050124 | A1 | 2/2008 | Tsuchida et al. |
| 2008/0154815 | A1 | 6/2008 | Martinez |
| 2010/0039649 | A1 | 2/2010 | Digonnet et al. |
| 2011/0188800 | A1 | 8/2011 | Futami |
| 2012/0070151 | A1 | 3/2012 | Shin et al. |
| 2013/0294782 | A1 | 11/2013 | Liboiron-Iadouceur et al. |
| 2015/0078754 | A1 | 3/2015 | Aflatouni et al. |
| 2015/0161993 | A1* | 6/2015 | Sainath ............... G10L 15/07 704/237 |
| 2015/0261058 | A1 | 9/2015 | Silverstone et al. |
| 2016/0162798 | A1 | 6/2016 | Marandi et al. |
| 2016/0358035 | A1* | 12/2016 | Ruan .................. G06F 18/2415 |
| 2017/0024642 | A1* | 1/2017 | Xiong ...................... G06F 7/58 |
| 2017/0148433 | A1* | 5/2017 | Catanzaro ............... G10L 25/18 |
| 2017/0200526 | A1 | 7/2017 | Guo et al. |
| 2017/0351293 | A1* | 12/2017 | Carolan ................. G02F 1/3526 |
| 2017/0351952 | A1 | 12/2017 | Zhang et al. |
| 2018/0089558 | A1 | 3/2018 | Wittenberg et al. |
| 2020/0144437 | A1 | 5/2020 | Gosciniak |
| 2020/0257751 | A1 | 8/2020 | Engheta et al. |
| 2020/0401920 | A1 | 12/2020 | Killoran et al. |

FOREIGN PATENT DOCUMENTS

| | | | |
|---|---|---|---|
| JP | H0554163 | A * | 3/1993 |
| JP | H1153422 | A * | 2/1999 |
| WO | 2017210550 | A1 | 12/2017 |
| WO | 2017214729 | A1 | 12/2017 |
| WO | WO-2017210550 | A1 * | 12/2017 ............. G02F 1/212 |

OTHER PUBLICATIONS

Experimental Realization of Any Discrete Unitary Operator (Year: 1994).*
Overview of Hybrid Optical Neural Networks (Year: 1996).*
Towards Trainable Media: Using Waves for Neural Network-style Learning (Year: 2015).*
Extended European Search Report for European Application No. 19799849.5, Search completed Nov. 30, 2021, Mailed Dec. 16, 2021, 11 Pgs.
Extended European Search Report for European Application No. 19799982.4, Search completed Jan. 18, 2022, Mailed Feb. 3, 2022, 12 Pgs.
International Preliminary Report on Patentability for International Application PCT/US2019/031747 Report issued Nov. 10, 2020, Mailed Nov. 19, 2020, 4 Pgs.
International Preliminary Report on Patentability for International Application PCT/US2019/031748 Report issued Nov. 10, 2020, Mailed Nov. 19, 2020, 4 Pgs.
International Search Report and Written Opinion for International Application No. PCT/US2019/031747, Search completed Jul. 10, 2019, Mailed Jul. 24, 2019, 9 Pgs.
International Search Report and Written Opinion for International Application No. PCT/US2019/031748, Search completed Jul. 12, 2019, Mailed Jul. 29, 2019, 9 Pgs.
"Artificial Intelligence Funding Trends", Retrieved from https://venturescanner.medium.com/artificial-intelligence-funding-trends-q3-2017-4e8a9b80fe53, published online on Sep. 2, 2017, 3 pages.

Abu-Mostafa et al., "Optical Neural Computers", Scientific American, vol. 256, No. 3, Mar. 1987, pp. 88-95, https://www.jstor.org/stable/24979343.
Ahmed et al., "A 100 GB/s transimpedance amplifier in 65 nm CMOS technology for optical communications", 2014 IEEE International Symposium on Circuits and Systems (ICAS), Jun. 1-5, 2014, pp. 1885-1888, DOI: 10.1109/ISCAS.2014.6865527.
Alibart et al., "Pattern classification by memristive crossbar circuits using ex situ and in situ training", Nature Communications, vol. 4, Issue 2072, Jun. 25, 2013, 7 pgs., https://doi.org/10.1038/ncomms3072.
Annoni et al., "Unscrambling light-automatically undoing strong mixing between modes", Light: Science & Applications, vol. 6, e17110, Dec. 1, 2017, article preview online Jun. 30, 2017, 10 pgs., doi:10.1038/lsa.2017.110.
Bao et al., "Monolayer Graphene as a Saturable Absorber in a Mode-Locked Laser", Nano Research, vol. 4, No. 3, 2011, pp. 297-307, DOI 10.1007/s12274-010-0082-9.
Brunner et al., "Parallel photonic information processing at gigabyte per second data rates using transient states", Nature Communications, vol. 4, Jan. 15, 2013, pp. 1364-1367, https://doi.org/10.1038/ncomms2368.
Capmany et al., "Microwave photonics combines two worlds", Nature Photonics, vol. 1, Jun. 1, 2007, pp. 319-330, DOI: 10.1038/nphoton.2007.89.
Carolan et al., "Universal linear optics", Science, vol. 349, Issue 6249, Aug. 14, 2015, pp. 711-716, DOI: 10.1126/science.aab3642.
Clements et al., "Optimal design for universal multiport interferometers", Optica vol. 3, Issue 12, Dec. 2016, pp. 1460-1465, https://doi.org/10.1364/OPTICA.3.001460.
Crespi et al., "Anderson localization of entangled photons in an integrated quantum walk", Nature Photonics, vol. 7, Apr. 2013, first published Mar. 3, 2013, pp. 322-328, https://doi.org/10.1038/nphoton.2013.26.
Crespi et al., "Integrated multimode interferometers with arbitrary designs for photonic boson sampling", Nature Photonics, vol. 7, Jul. 2013, first published May 26, 2013, pp. 545-549, https://doi.org/10.1038/nphoton.2013.112.
Depuy et al., "59-dBOmega 68-GHz Variable Gain-Bandwidth Differential Linear TIA in 0.7-µm InP DHBT for 400-GB/s Optical Communication Systems", 2015 IEEE Compound Semiconductor Integrated Circuit Symposium (CSICS), Oct. 11-14, 2015, 4 pgs., DOI: 10.1109/CSICS.2015.7314463.
Duport et al., "Fully analogue photonic reservoir computer", Scientific Reports, 2016, vol. 6, No. 22381, 12 pgs., DOI: 10.1038/srep22381.
Egorov et al., "Genetically optimized all-dielectric metasurfaces", Optics Express, vol. 25, No. 3, Feb. 7, 2017, first published Feb. 1, 2017, pp. 2583-2593, https://doi.org/10.1364/OE.25.002583.
Frei et al., "Geometry projection method for optimizing photonic nanostructures", Optics Letters, vol. 32, Issue 1, Jan. 1, 2007, first published Dec. 13, 2006, pp. 77-79, https://doi.org/10.1364/OL.32.000077.
Georgieva et al., "Feasible adjoint sensitivity technique for EM design optimization", IEEE Transactions on Microwave Theory and Techniques, vol. 50, Issue 12, Dec. 2002, pp. 2751-2758, DOI: 10.1109/TMTT.2002.805131.
Ghelfi et al., "A fully photonics-based coherent radar system", Nature, vol. 507, Mar. 20, 2014, first published Mar. 19, 2014, pp. 341-345, https://doi.org/10.1038/nature 13078.
Goodfellow et al., "Deep Learning", The MIT Press, Cambridge, Massachusetts, 2016, 26 pgs.
Graves et al., "Hybrid computing using a neural network with dynamic external memory", Nature, vol. 538, Oct. 27, 2016, first published Oct. 12, 2016, pp. 471-476, https://doi.org/10.1038/nature20101.
Graves et al., "Neural Turing Machines", arXiv:1410.5401v2 [cs.NE], 10 Dec. 10, 2014, 26 pgs.
Green, "Self-consistent optical parameters of intrinsic silicon at 300 K including temperature coefficients", Solar Energy Materials and Solar Cells, vol. 92, No. 11, Nov. 2008, pp. 1305-1310, doi:10.1016/j.solmat.2008.05.0009.

(56) References Cited

OTHER PUBLICATIONS

Harris, "Programmable nanophotonics for quantum information processing and artificial intelligence", Thesis, Massachusetts Institute of Technology, 2017, 126 pgs.
Harris et al., "Quantum transport simulations in a programmable nanophotonic processor", Nature Photonics, vol. 11, 2017, pp. 447-452, https://doi.org/10.1038/nphoton.2017.95.
Hermans et al., "Photonic Delay Systems as Machine Learning Implementation", Journal of Machine Learning Research, vol. 16, 2015, pp. 2081-2097.
Hermans et al., "Towards trainable media: Using waves for neural network-style training", arXiv preprint arXiv:1510.03776, Sep. 30, 2015, 20 pgs.
Hermans et al., "Trainable hardware for dynamical computing using error backpropagation through physical media", Nature Communications, vol. 6, Issue. 6729, Mar. 24, 2015, 8 pgs., DOI: https://doi.org/10.1038/ncomms7729.
Hughes et al., "Training of photonic neural networks through in situ backpropagation and gradient measurement", Optica, vol. 5, No. 7, Jul. 2018, first published Jul. 19, 2018, pp. 864-871, https://doi.org/10.1364/OPTICA.5.000864.
Hughes et al., "Method for computationally efficient design of dielectric laser accelerator structures", Optics Express, vol. 25, Issue 13, Jun. 26, 2017, pp. 15414-15427, https://doi.org/10.1364/OE.25.015414.
Hughes et al., "On-Chip Laser Power Delivery System for Dielectric Laser Accelerators", arXiv:1709.04441v1 [physics.optics], Sep. 13, 2017, 14 pgs.
Jensen et al., "Topology optimization of photonic crystal structures: a high-bandwidth low-loss T-junction waveguide", Journal of the Optical Society of America B, vol. 22, Issue 6, Jun. 2005, pp. 1191-1198, https://doi.org/10.1364/JOSAB.22.001191.
Jiang et al., "Low-dimensional nanomaterial saturable absorbers for ultrashort-pulsed waveguide lasers", Optical Materials Express, vol. 8, Issue 10, Oct. 1, 2018, first published Sep. 10, 2018, pp. 3055-3071, https://doi.org/10.1364/OME.8.003055.
Jiao et al., "A 70 dBohm 2.3 GHz low noise transimpedance amplifier", 2013 IEEE Third International Conference on Consumer Electronics ¿ Berlin (ICCE—Berlin), Sep. 9-11, 2013, pp. 322-325, DOI: 10.1109/ICCE- Berlin.2013.6697985.
Joy, "The spatial resolution limit of electron lithography", Microelectronic Engineering, vol. 1, Issue 2, Oct. 1983, pp. 103-119, https://doi.org/10.1016/0167-9317(83)90024-2.
Jutamulia et al., "Overview of hybrid optical neural networks", Science, vol. 28, 1996, pp. 59-72.
Kingma et al., "Adam: A Method for Stochastic Optimization", arXiv.org, Retrieved from: https://arxiv.org/abs/1412.6980v1 [cs.LG], Dec. 22, 2014, 9 pgs.
Koos et al., "Nonlinear silicon-on-insulator waveguides for all-optical signal processing", Optics Express, vol. 15, No. 10, May 14, 2007, first published May 1, 2007, pp. 5976-5990, doi: 10.1364/oe.15.005976.
Larger et al., "Photonic information processing beyond Turing: an optoelectronic implementation of reservoir computing", Optic Express, vol. 20, No. 3, Jan. 30, 2012 first published Jan. 27, 2012, pp. 3241-3249.
Lecun et al., "Deep learning", Nature, May 27, 2015, vol. 521, No. 7553, pp. 436-444, doi: 10.1038/nature14539.
Lecun et al., "Gradient-Based Learning Applied to Document Recognition", Proceedings of the IEEE, Nov. 1998, vol. 86, No. 11, pp. 2278-2324.
Leelar et al., "Learning with Deep Photonic Neural Networks", 2017 IEEE Workshop on Recent Advances in Photonics (WRAP), 2017, pp. 1-7.
Li et al., "Reconfigurable controlled two-qubit operation on a quantum photonic chip", New Journal of Physics, vol. 13, 115009, Nov. 2011, 8 pgs., doi:10.1088/1367-2630/13/11/115009.
Liebmann et al., "TCAD development for lithography resolution enhancement", IBM Journal of Research and Development, vol. 45, No. 5, Sep. 2001, pp. 651-665, DOI: 10.1147/rd.455.0651.
Marpaung et al., "Integrated microwave photonics", Laser & Photonic Reviews, vol. 7, Issue 4, Jul. 2013, pp. 506-538, first published Jan. 16, 2013, https://doi.org/10.1002/lpor.201200032.
Marty et al., "Advanced etching of silicon based on deep reactive ion etching for silicon high aspect ratio microstructures and three-dimensional micro- and nanostructures", Microelectronics Journal, vol. 36, Issue 7, Jul. 2005, pp. 673-677, https://doi.org/10.1016/j.mejo.2005.04.039.
Merolla et al., "A million spiking-neuron integrated circuit with a scalable communication network and interface", Science, Aug. 8, 2014, vol. 345, No. 6197, pp. 668-673, doi: 10.1126/science.1254642.
Metcalf et al., "Multiphoton quantum interference in a multiport integrated photonic device", Nature Communications, vol. 1, No. 1356, Jan. 15, 2013, pp. 1-7, DOI:10.1038/ncomms2349.
Miller, "Arbitrary and Reconfigurable Optics—New Opportunities for Integrated Photonics", Frontiers in Optics 2017, OSA Technical Digest (online) (Optica Publishing Group, 2017), paper FTu4A.1, 1 pg., https://doi.org/10.1364/FIO.2017.FTu4A.1.
Miller, "Attojoule Optoelectronics for Low-Energy Information Processing and Communications", Journal of Lightwave Technology, vol. 35, Issue 3, Feb. 1, 2017, pp. 346-396, DOI: 10.1109/JLT.2017.2647779.
Miller, "Perfect optics with imperfect components", Optica, vol. 2, Issue 8, 2015, pp. 747-750, https://doi.org/10.1364/OPTICA.2.000747.
Miller, "Self-aligning universal beam coupler", Optics Express vol. 21, Issue 5, Mar. 11, 2013, first published Mar. 6, 2013, pp. 6360-6370, https://doi.org/10.1364/OE.21.006360.
Miller, "Setting up meshes of interferometers—reversed local light interference method", Optics Express, vol. 25, Issue 23, Nov. 13, 2017, pp. 29233-29248, https://doi.org/10.1364/OE.25.029233.
Miller et al., "Self-configuring universal linear optical component [Invited]", Photonics Research. Vol. 1, Issue 1, Jun. 2013, pp. 1-15, https://doi.org/10.1364/PRJ.1.000001.
Ng et al., "Ultra-High Aspect Ratio Trenches in a Single crystal silicon with epatixial gap tuning", 2013 Transducers and Eurosensors XXVII: The 17th International Conference on Solid-State Sensors, pp. 182-185.
Nozaki et al., "Amplifier-Free Bias-Free Receiver Based on Low-Capacitance Nanophotodetector", IEEE Journal of Selected Topics in Quantum Electronics, vol. 24, Issue: 2, Mar.-Apr. 2018, first published Dec. 20, 2017, 11 pgs., DOI: 10.1109/JSTQE.2017.2777105.
Pai et al., "Matrix optimization on universal unitary photonic devices", arXiv:1808.00458v3 [eess.SP] May 22, 2019, 18 pgs.
Pallipuram et al., "A comparative study of GPU programming models and architectures using neural networks", The Journal of Supercomputing, vol. 61, Sep. 2012, first published May 31, 2011, pp. 673-718, https://doi.org/10.1007/s11227-011-0631-3.
Park et al., "Monolayer graphene saturable absorbers with strongly enhanced evanescent-field interaction for ultrafast fiber laser mode-locking", Optics Express vol. 23, Issue 15, Jul. 27, 2015, first published Jul. 22, 2015, pp. 19806-19812, https://doi.org/10.1364/OE.23.019806.
Paszke et al., "PyTorch: An Imperative Style, High-Performance Deep Learning Library", 33rd Conference on Neural Information Processing Systems (NeurIPS 2019), Vancouver, Canada, 12 pgs.
Peng et al., "Neuromorphic Photonic Integrated Circuits", IEEE Journal of Selected Topics in Quantum Electronics, vol. 24, Issue: 6, Nov.-Dec. 2018, 15 pgs., DOI: 10.1109/JSTQE.2018.2840448.
Prezioso et al., "Training and operation of an integrated neuromorphic network based on metal-oxide memristors", Nature, vol. 521, May 7, 2015, pp. 61-64, includes supplementary info, doi: 10.1038/nature14441.
Psaltis et al., "Adaptive optical networks using photorefractive crystals", Applied Optics, vol. 27, No. 9. May 1, 2019, pp. 1752-1759.
Psaltis et al., "Holography in artificial neural networks", Nature, vol. 343, Jan. 25, 1990, pp. 325-330.
Reck et al., "Experimental realization of any discrete unitary operator", Physical Review Letters, vol. 73, No. 1, Jul. 1, 1994, pp. 58-61, doi: 10.1103/PhysRevLett.73.58.

(56) References Cited

OTHER PUBLICATIONS

Rosenbluth et al., "A high performance photonic pulse processing device", Optics Express, vol. 17, Issue 25, Dec. 2009, first published Nov. 30, 2009, pp. 22767-22772, https://doi.org/10.1364/OE.17.022767.

Schevenels et al., "Robust topology optimization accounting for spatially varying manufacturing errors", Computer Methods in Applied Mechanics and Engineering, vol. 200, Issues 49-52, Dec. 1, 2011, published online Aug. 26, 2011, pp. 3613-3627, https://doi.org/10.1016/j.cma.2011.08.006.

Sell et al., "Large-Angle, Multifunctional Metagratings Based on Freeform Multimode Geometries", Nano Letters, vol. 17, No. 6, May 1, 2017, pp. 3752-3757, DOI: 10.1021/acs.nanolett.7b01082.

Settaluri et al., "First Principles Optimization of Opto-Electronic Communication Links", IEEE Transactions on Circuits and Systems-I: Regular Papers, vol. 64, No. 5, May 2017, pp. 1270-1283, 10.1109/TCSI.2016.2633942.

Shadbolt et al., "Generating, manipulating and measuring entanglement and mixture with a reconfigurable photonic circuit", Nature Photonics, vol. 6, Jan. 2012, first published Dec. 11, 2011, pp. 45-49. https://doi.org/10.1038/nphoton.2011.283.

Shainline et al., "Superconducting Optoelectronic Circuits for Neuromorphic Computing", Phys. Rev. Applied vol. 7, No. 3, 034013, Mar. 23, 2017, 35 pgs., arXiv:1610.00053 [cs.NE] Nov. 10, 2016.

Shastri et al., "Spike processing with a graphene excitable laser", Scientific Reports, vol. 6, No. 19126, 2016, 12 pages.

Shen et al., "An integrated-nanophotonics polarization beamsplitter with 2.4 x 2.4 µm2 footprint", Nature Photonics, vol. 9, Jun. 2015, first published May 18, 2015, pp. 378-382, https://doi.org/10.1038/nphoton.2015.80.

Shen et al., "Deep learning with coherent nanophotonic circuits", Nature Photonics, 2017, vol. 11, pp. 441-446, https://doi.org/10.1038/nphoton.2017.93.

Shi et al., "Optimization of Multilayer Optical Films with a Memetic Algorithm and Mixed Integer Programming", ACS Photonics, ACS Photonics, Just Accepted Manuscript, published online Dec. 15, 2017, 24 pgs., https://doi.org/10.1021/acsphotonics.7b01136.

Shin et al., "Choice of the perfectly matched layer boundary condition for frequency-domain Maxwell's equations solvers", Journal of Computational Physics, vol. 231, Issue 8, Apr. 20, 2012, pp. 3406-3431, https://doi.org/10.1016/j.jcp.2012.01.013.

Spring et al., "Boson Sampling on a Photonic Chip", Science, vol. 339, Issue 6121, Dec. 20, 2012, pp. 798-801, DOI: 10.1126/science.1231692.

Srivastava et al., "Dropout: A Simple Way to Prevent Neural Networks from Overfitting", Journal of Machine Learning Research, vol. 15, No. 1, Jun. 1, 2014, pp. 1929-1958.

Su et al., "Fully-automated optimization of grating couplers", Optics Express, vol. 26, No. 4, Feb. 4, 2018, pp. 4023-4034, https://doi.org/10.1364/OE.26.004023.

Sun et al., "Large-scale nanophotonic phased array", Nature, vol. 493, Jan. 10, 2013, first published Jan. 9, 2013, pp. 195-199, https://doi.org/10.1038/nature11727.

Tait et al., "A silicon photonic modulator neuron", arXiv:1812.11898v1 [physics.app-ph] Dec. 9, 2018, 16 pgs.

Tait et al., "Broadcast and Weight: An Integrated Network For Scalable Photonic Spike Processing", Journal of Lightwave Technology, vol. 32, 2014, pp. 4029-4041.

Tait et al., "Demonstration of a silicon photonic neural network", 2016 IEEE Photonics Society Summer Topical Meeting Series (SUM), 2016, pp. 72-73.

Tait et al., "Neuromorphic photonic networks using silicon photonic weight banks", Scientific Reports, vol. 7, No. 7430, Aug. 7, 2017, 19 pgs., DOI:10.1038/s41598-017-07754-z.

Tait et al., "The Dream: An Integrated Photonic Thresholder", Journal of Lightwave Technology IEEE USA, vol. 31. No. 8, Apr. 15, 2013, pp. 1263-1272, DOI: 10.1109/JLT.2013.2246544.

Trabelsi et al., "Deep Complex Networks", arXiv:1705.09792v4 [cs.NE], Feb. 25, 2018, 19 pgs.

Trentin, "Networks with trainable amplitude of activation functions", Neural Networks, vol. 14, Issues 4-5, May 2001, pp. 471-493, https://doi.org/10.1016/S0893-6080(01)00028-4.

Vandoorne et al., "Experimental demonstration of reservoir computing on a silicon photonics chip", Nature Communications, vol. 5, No. 3541, Mar. 24, 2014, 6 pgs., https://doi.org/10.1038/ncomms4541.

Veronis et al., "Method for sensitivity analysis of photonic crystal devices", Optics Letters vol. 29, Issue 19, Oct. 1, 2004, pp. 2288-2290, https://doi.org/10.1364/OL.29.002288.

Vieu et al., "Electron beam lithography: resolution limits and applications", Applied Surface Science, Sep. 1, 2000, vol. 164, Issues 1-4, pp. 111-117, https://doi.org/10.1016/S0169-4332(00)00352-4.

Wagner et al., "Multilayer optical learning networks", Applied Optics, vol. 26, Issue 23, 1987, pp. 5061-5076, https://doi.org/10.1364/AO.26.005061.

Wang et al., "Robust design of topology-optimized metasurfaces", Optical Materials Express, vol. 9, No. 2, Feb. 1, 2019, published online Jan. 10, 2019, pp. 469-482, https://doi.org/10.1364/OME.9.000469.

Wen et al., "Robust Freeform Metasurface Design Based on Progressively Growing Generative Networks", ACS Photonics, vol. 7, No. 8, Jun. 19, 2020, pp. 2098-2104. https://doi.org/10.1021/acsphotonics.0c00539.

Wills, "Doing Neural Nets with Photons", The Optical Society, Jun. 19, 2017, 4 pgs.

Woods et al., "Photonic Neural Networks", Optical Computing, vol. 8, Apr. 2012, pp. 257-259.

Wu et al., "High aspect ratio silicon etch: A review", Journal of Applied Physics, 2010, vol. 108, pp. 051101-1-051101-20, https://doi.org/10.1063/1.3474652.

Yablonovitch et al., "Optical projection lithography at half the Rayleigh resolution limit by two photon exposure", Opt. Eng., 1998, Materials, fundamentals and Applications Topical Meeting, 1998, pp. 126-128.

Yeom et al., "Maximum achievable aspect ratio in deep reactive ion etching of silicon due to aspect ratio dependent transport and the microloading effect", Journal of Vacuum Science and Technology, vol. 23, Nov./Dec. 2005, pp. 2319-2329, DOI:10.1116/1.2101678.

Yu et al., "A low-noise high-gain transimpedance amplifier with high dynamic range in 0.13im CMOS", IEEE International Symposium on Radio-Frequency Integration Technology (RFIT), Nov. 2012, pp. 37-40, Doi: 10.1109/RFIT.2012.6401606.

Yu et al., "Design of AGC amplifier for CMOS Image Sensor", 2012 IEEE International Symposium on Radio-Frequency Integration Technology (RFIT), Nov. 21-23, 2012, pp. 34-36, DOI: 10.1109/RFIT.2012.6401605.

Zhou et al., "Minimum length scale in topology optimization by geometric constraints", Computer Methods in Applied Mechanics and Engineering, vol. 293, Aug. 15, 2015, pp. 266-282, DOI: 10.1016/j.cma.2015.05.003.

\* cited by examiner

TRAINING OF PHOTONIC NEURAL NETWORKS THROUGH IN SITU BACKPROPAGATION

CROSS-REFERENCE TO RELATED APPLICATIONS

The present application is a U.S. national phase of PCT Application No. PCT/US2019/031747 entitled "Training of Photonic Neural Networks Through in situ Backpropagation", filed May 5, 2019, which claims the benefit of and priority to U.S. Provisional Patent Application No. 62/669,899 entitled "Training of Photonic Neural Networks Through in Situ Backpropagation", filed May 10, 2018 and to U.S. Provisional Patent Application No. 62/783,992 entitled "Training of Photonic Neural Networks Through in Situ Backpropagation", filed Dec. 21, 2018. The disclosures of PCT Application No. PCT/US20191031747, and U.S. Provisional Patent Application Ser. Nos. 62/669,899 and 62/783,992 are herein incorporated by reference in their entireties.

STATEMENT OF FEDERALLY SPONSORED RESEARCH

This invention was made with Government support under contract FA9550-17-1-0002 awarded by the Air Force Office of Scientific Research. The Government has certain rights in the invention.

FIELD OF THE INVENTION

The present invention generally relates to photonic neural networks and more specifically relates to training of photonic neural networks through in situ backpropagation.

BACKGROUND

Recently, integrated optics has gained interest as a hardware platform for implementing machine learning algorithms, including artificial neural networks (ANNs), which rely heavily on matrix-vector multiplications that may be done efficiently in photonic circuits. Artificial neural networks, and machine learning in general, are becoming ubiquitous for an impressively large number of applications. This has brought ANNs into the focus of research in not only computer science, but also electrical engineering, with hardware specifically suited to perform neural network operations actively being developed. There are significant efforts in constructing artificial neural network architectures using various electronic solid-state platforms, but ever since the conception of ANNs, a hardware implementation using optical signals has also been considered. Photonic implementations benefit from the fact that, due to the non-interacting nature of photons, linear operations—like the repeated matrix multiplications found in every neural network algorithm—can be performed in parallel, and at a lower energy cost, when using light as opposed to electrons.

Many implementations of photonic neural networks are trained using a model of the system simulated on a regular computer, but this can be inefficient for two reasons. First, this strategy depends entirely on the accuracy of the model representation of the physical system. Second, unless one is interested in deploying a large number of identical, fixed copies of the ANN, any advantage in speed or energy associated with using the photonic circuit is lost if the training must be done on a regular computer. Alternatively, training using a brute force, in situ computation of the gradient of the objective function has been proposed. However, this strategy involves sequentially perturbing each individual parameter of the circuit, which is highly inefficient for large systems.

SUMMARY OF THE INVENTION

Systems and methods for training photonic neural networks in accordance with embodiments of the invention are illustrated. One embodiment includes a method for training a set of one or more optical interference units (OIUs) of a photonic artificial neural network (ANN), wherein the method includes calculating a loss for an original input to the photonic ANN, computing an adjoint input based on the calculated loss, measuring intensities for a set of one or more phase shifters in the set of OIUs when the computed adjoint input and the original input are interfered with each other within the set of OIUs, computing a gradient from the measured intensities, and tuning phase shifters of the OIU based on the computed gradient.

In a further embodiment, computing the adjoint input includes sending the calculated loss through output ports of the ANN.

In still another embodiment, the intensities for each phase shifter of the set of phase shifters is measured after the phase shifter.

In a still further embodiment, the set of OIUs includes a mesh of controllable Mach-Zehnder interferometers (MZIs) integrated in a silicon photonic circuit.

In yet another embodiment, computing the adjoint input includes sending the calculated loss through output ports of the ANN.

In a yet further embodiment, the loss is the result of a mean squared cost function.

In another additional embodiment, the ANN is a feed-forward ANN.

In a further additional embodiment, the ANN is are current neural network (RNN).

In another embodiment again, the ANN further includes a set of one or mom activation units, wherein each OIU performs a linear operation and each activation unit performs a non-linear function on the input.

In a further embodiment again, computing the adjoint input includes linearizing at least one activation unit of the set of activation units prior to sending an input through the ANN.

In still yet another embodiment, the method further includes steps for performing dropout during training by shutting off channels in the activation units.

In a still yet further embodiment, non-linear functions of the ANN are performed using an electronic circuit.

In still another additional embodiment, each OIU of the set of OIUs includes a same number of input ports and output ports.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs.

DETAILED DESCRIPTION

Turning now to the drawings, systems and methods in accordance with certain embodiments of the invention can be used to train photonic neural networks. In some embodiments, methods can compute the gradient of the cost function of a photonic artificial neural network (ANN) by use of only in situ intensity measurements. Processes in accordance with several embodiments of the invention physically implement the adjoint variable method (AVM). Furthermore, methods in accordance with a number of embodiments of the invention scale in constant time with respect to the number of parameters, which allows for backpropagation to be efficiently implemented in a hybrid opto-electronic network. Although many of the examples described herein are described with reference to a particular hardware implementation of a photonic ANN, one skilled in the art will recognize that methods and systems can be readily applied to other photonic platforms without departing from the heart of the invention.

Currently, there is no efficient protocol for the training of photonic neural networks, which is a crucial step for any machine learning application, and should ideally be performed on the same platform. Methods in accordance with a number of embodiments of the invention enable highly efficient, in situ training of a photonic neural network. In a variety of embodiments, adjoint methods may be used to derive the photonic analogue of the backpropagation algorithm, which is the standard method for computing gradients of conventional neural networks. Gradients in accordance with a number of embodiments of the invention may be obtained exactly by performing intensity measurements within the device.

Training protocols in accordance with many embodiments of the invention can greatly simplify the implementation of backpropagation. Beyond the training of photonic machine learning implementations, methods in accordance with some embodiments of the invention may also be of broader interest to experimental sensitivity analysis of photonic systems and the optimization of reconfigurable optics platforms, among other applications.

Photonic Neural Networks

In its most general case, a feed-forward ANN maps an input vector to an output vector via an alternating sequence of linear operations and element-wise nonlinear functions of the vectors, also called 'activations'. A cost function, $\mathcal{L}$, is defined over the outputs of the ANN and the matrix elements involved in the linear operations are tuned to minimize $\mathcal{L}$ over a number of training examples via gradient-based optimization. The 'backpropagation algorithm' is typically used to compute these gradients analytically by sequentially utilizing the chain rule from the output layer backwards to the input layer.

Figure 1:
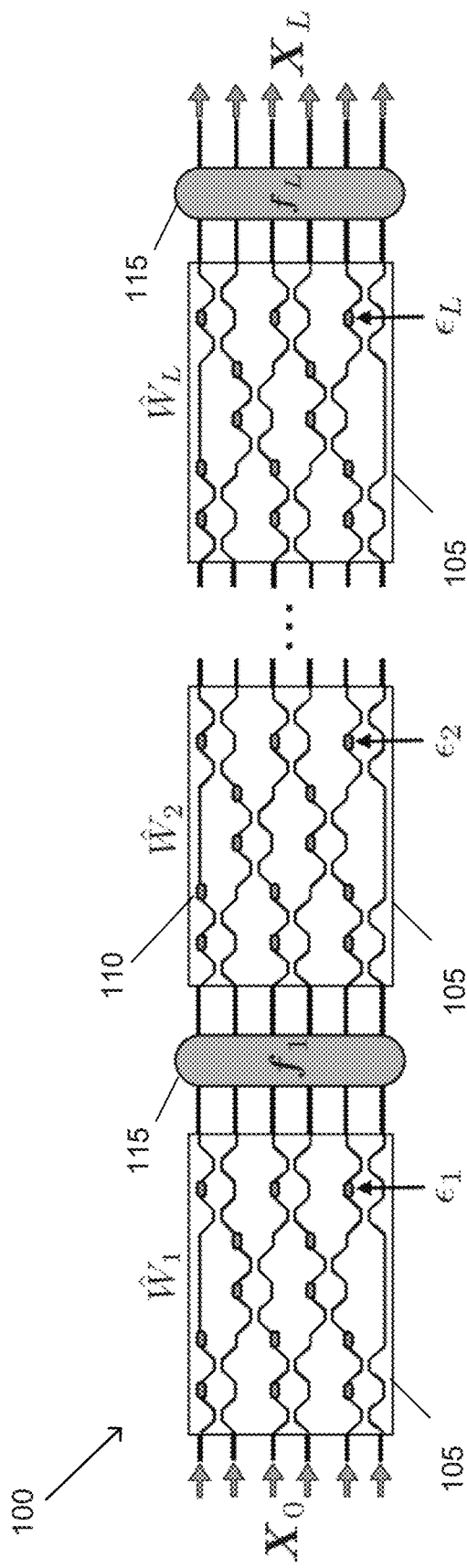
FIG. 1 illustrates an example of a schematic for an artificial neural network (ANN).

A photonic hardware platform implemented in accordance with certain embodiments of the invention is illustrated in FIG. 1. The boxed regions correspond to optical interference units (OIUs) 105 that perform a linear operation represented by the matrix $\hat{W}_l$. Each OIU can include a number of integrated phase shifters (e.g., 110) illustrated as rounded shapes within each OIU. In many embodiments, integrated phase shifters can be used to control an OIU and train a network. Photonic hardware platform 100 also includes nonlinear activations 115 represented as $f_i(\cdot)$.

In this example, photonic element 100 performs linear operations using optical interference units (OIUs). OIUs in accordance with several embodiments of the invention are meshes of controllable Mach-Zehnder interferometers (MZIs) integrated in a silicon photonic circuit. By tuning the phase shifters integrated in the MZIs, any unitary N×N operation on the input can be implemented, which finds applications both in classical and quantum photonics. In photonic ANNs in accordance with some embodiments of the invention, OIUs can be used for each linear matrix-vector multiplication. In certain embodiments, nonlinear activations can be performed using an electronic circuit, which involves measuring the optical state before activation, performing the nonlinear activation function on an electronic circuit such as a digital computer, and preparing the resulting optical state to be injected to the next stage of the ANN.

In the description of this example, the OIU is described by a number, N, of single-mode waveguide input ports coupled to the same number of single-mode output ports through a linear and lossless device. In certain embodiments, the device may also be extended to operate on differing numbers of inputs and outputs. OIUs in accordance with some embodiments of the invention implement directional propagation such that all power flows exclusively from the input ports to the output ports. In its most general form, devices implement the linear operation $$\hat{W} X_{in} = Z_{out}, \quad (1)$$

where $X_{in}$ and $Z_{out}$ are the modal amplitudes at the input and output ports, respectively, and $\hat{W}$, or the transfer matrix, is the off-diagonal block of the system's full scattering matrix, $$\begin{pmatrix} X_{out} \\ Z_{out} \end{pmatrix} = \begin{pmatrix} 0 & \hat{W}^T \\ \hat{W} & 0 \end{pmatrix} \begin{pmatrix} X_{in} \\ Z_{in} \end{pmatrix}. \quad (2)$$

The diagonal blocks are zero because forward-only propagation is assumed, while the off-diagonal blocks are the transpose of each other because a reciprocal system is assumed. $Z_{in}$ and $X_{out}$ A correspond to the input and output modal amplitudes, respectively, if the device were run in reverse, i.e., sending a signal in from the output ports.

Operation and Training with Backpropagation

A key requirement for the utility of any ANN platform is the ability to train the network using algorithms such as error backpropagation. Such training typically demands significant computational time and resources and it is generally desirable for error backpropagation to be implemented on the same platform.

Figure 2:
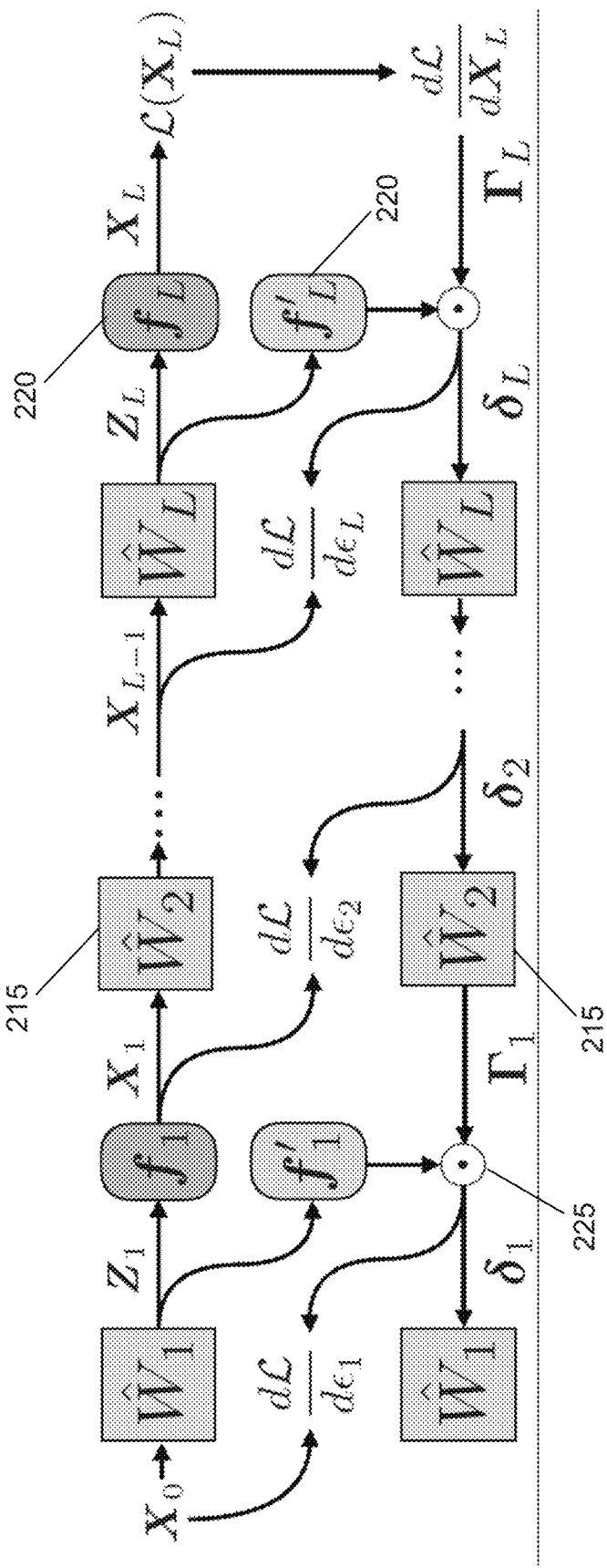
FIG. 2 illustrates an example of operations in an ANN.

The operation and gradient computation in an ANN in accordance with an embodiment of the invention is illustrated in FIG. 2. In this example, propagation through a square cell (e.g., 215) corresponds to matrix multiplication, while propagation through a rounded region (e.g., 220) corresponds to activation. The ⊙ (e.g., 225) indicates element-wise vector multiplication.

The top row 205 corresponds to the forward propagation steps in the operation and training of an ANN. For the forward propagation step, processes in accordance with numerous embodiments of the invention begin with an initial input to the system, $X_0$, and perform a linear operation on this input using an OIU represented by the matrix $\hat{W}_1$. In several embodiments, processes can apply an element-wise nonlinear activation, $f_l(\cdot)$, on the outputs, giving the input to the next layer. This process can be repeated for each layer l until the output layer, L. Written compactly, for l=1 . . . L $$X_l = f_l(\hat{W}_l X_{l-1}) \equiv f_l(Z_l). \tag{3}$$

Once forward propagation is completed, a cost function is computed to train the network. Cost function $\mathcal{L}$ is an explicit function of the outputs from the last layer, $\mathcal{L} = \mathcal{L}(X_L)$. To train the network, cost functions can be minimized with respect to the linear operators, $\hat{W}_l$, which may be adjusted by tuning the integrated phase shifters within the OIUs in accordance with some embodiments of the invention. In a variety of embodiments, training methods can operate without resorting to an external model of the system, while allowing for the tuning of each parameter to be done in parallel, therefore scaling significantly better with respect to the number of parameters when compared to a brute force gradient computation method.

Once a cost (or loss) function is computed, backward propagation is performed to adjust the model based on the computed loss. Bottom row 210 of FIG. 2 illustrates the backward propagation steps. In a number of embodiments, backpropagation processes can derive an expression for the gradient of the cost function with respect to the permittivities of the phase shifters in the OIUs. In the following, $\varepsilon_l$ is the permittivity of a single phase shifter in layer l, as the same derivation holds for each of the phase shifters present in that layer. Note that $\hat{W}_l$ has an explicit dependence on $\varepsilon_l$, but all field components in the subsequent layers also depend implicitly on $\varepsilon_l$.

As a demonstration, a mean squared cost function is calculated $$\mathcal{L} = \frac{1}{2}(X_L - T)^\dagger (X_L - T), \tag{4}$$

where T is a complex-valued target vector corresponding to the desired output of a system given input $X_0$.

Starting from the last layer in the circuit, the derivatives of the cost function with respect to the permittivity of the phase shifters in the last layer $\varepsilon_L$ are given by $$t\frac{d\mathcal{L}}{d\varepsilon_L} = \mathcal{R}\left\{(X_L - T)^\dagger \frac{dX_L}{d\varepsilon_L}\right\} \tag{5}$$

$$= \mathcal{R}\left\{(\Gamma_L \odot f_L'(Z_L))^T \frac{d\hat{W}_L}{d\varepsilon_L} X_{L-1}\right\} \tag{6}$$

$$\equiv \mathcal{R}\left\{\delta_L^T \frac{d\hat{W}_L}{d\varepsilon_L} X_{L-1}\right\}, \tag{7}$$

where ⊙ is element-wise vector multiplication, defined such that, for vectors a and b, the i-th element of the vector a⊙b is given by $a_i b_i$, $\mathcal{R}\{\cdot\}$ gives the real part, $f_l'(\cdot)$ is the derivative of the lth layer activation function with respect to its (complex) argument. The vector $\delta_L \equiv \Gamma_L \odot f_L'$ is defined in terms of the error vector $\Gamma_L \equiv (X_L - T)^*$.

For any layer l<L, the chain rule can be used to perform a recursive calculation of the gradients.

$$\Gamma_l = \hat{W}_{l+1}^T \delta_{l+1} \tag{8}$$

$$\delta_l = \Gamma_l \odot f_l'(Z_l) \tag{9}$$

$$\frac{d\mathcal{L}}{d\varepsilon_L} = \mathcal{R}\left\{\delta_l^T \frac{d\hat{W}_l}{d\varepsilon_l} X_{l-1}\right\}. \tag{10}$$

This process is illustrated in the backward propagation of the second row 210 of FIG. 2, which computes the $\delta_l$ vectors sequentially from the output layer to the input layer. The computation of $\delta_l$ requires performing the operation $\Gamma_l = \hat{W}_{l+1}^T \delta_{l+1}$, which corresponds physically to sending $\delta_{l+1}$ into the output end of the OIU in layer l+1. In this way, processes in accordance with many embodiments of the invention 'backpropagate' the vectors $\delta_l$ and $\Gamma_l$ physically through the entire circuit.

In some embodiments, training a photonic ANN relies on the ability to create arbitrary complex inputs. Processes in accordance with several embodiments of the invention require an integrated intensity detection scheme to occur in parallel and with virtually no loss. In numerous embodiments, this can be implemented by integrated, transparent photo-detectors.

The problem of overfitting is one that can be addressed by 'regularization' in any practical realization of a neural network. Photonic ANNs in accordance with various embodiments of the invention provide a convenient alternative approach to regularization based on 'dropout'. In various embodiments, in a dropout procedure, certain nodes can be probabilistically and temporarily 'deleted' from the network during train time, which has the effect of forcing the network to find alternative paths to solve the problem at hand. This has a strong regularization effect and has become popular in conventional ANNs. Dropout in accordance with some embodiments of the invention can be implemented in the photonic ANN by 'shutting off' channels in the activation functions during training. Specifically, at each time step and for each layer L and element i, one may set $f_l(Z_l)=0$ with some fixed probability.

Specific processes for training photonic neural networks in accordance with embodiments of the invention are described above; however, one skilled in the art will recognize that any number of processes can be utilized as appropriate to the requirements of specific applications in accordance with embodiments of the invention.

For example, the discussion above assumes that the functions $f_l(\cdot)$ are holomorphic. For each element of input $Z_l$, labeled z, this means that the derivative of $f_l(z)$ with respect to its complex argument is well defined. In other words, the derivative $$\frac{df_l}{dz} = \lim_{\Delta z \to 0} \frac{f_l(z + \Delta z) - f_l(z - \Delta z)}{2\Delta z} \tag{11}$$

does not depend on the direction that $\Delta z$ approaches 0 in the complex plane.

In numerous embodiments, the backpropagation derivation can be extended to non-holomorphic activation functions. In the backpropagation algorithm, the change in the mean-squared loss function with respect to the permittivity of a phase shifter in the last layer OIU as written in Eq. (5) is $$\frac{d\mathcal{L}}{d\varepsilon_L} = \mathcal{R}\left\{\Gamma_L^T \frac{dX_L}{d\varepsilon_L}\right\} \quad (12)$$

Where the error vector was defined as $\Gamma_L \equiv (X_L - T)^*$ for simplicity and $X_L = f_L(\hat{W}_L X_{L-1})$ is the output of the final layer.

To evaluate this expression for non-holomorphic activation functions, $f_L(Z)$ and its argument can be split into their real and imaginary parts $$f_L(Z) = u(\alpha, \beta) + iv(\alpha, \beta), \quad (13)$$

where i is the imaginary unit and $\alpha$ and $\beta$ are the real and imaginary parts of $Z_L$, respectively.

Evaluating $$\frac{dX_L}{d\varepsilon_L} = \frac{df_L(Z)}{d\varepsilon_L}$$

gives the following via the chain rule $$\frac{df}{d\varepsilon} = \frac{du}{d\alpha} \odot \frac{d\alpha}{d\varepsilon} + \frac{du}{d\beta} \odot \frac{d\beta}{d\varepsilon} + i\frac{dv}{d\alpha} \odot \frac{d\alpha}{d\varepsilon} + i\frac{dv}{d\beta} \odot \frac{d\beta}{d\varepsilon}, \quad (14)$$

where the layer index has been dropped for simplicity. Here, terms of the form dx/dy correspond to element-wise differentiation of the vector x with respect to the vector y. For example, the i-th element of the vector dx/dy is given by dx/dy.

Now, inserting into Eq. (12):

$$\frac{d\mathcal{L}}{d\varepsilon_L} = \mathcal{R}\left\{\Gamma_L^T \odot \left(\frac{du}{d\alpha} + i\frac{dv}{d\alpha}\right)^T \frac{d\alpha}{d\varepsilon_L} \quad (15)$$

$$+ \Gamma_L^T \odot \left(\frac{du}{d\beta} + i\frac{dv}{d\beta}\right)^T \frac{d\beta}{d\varepsilon_L}\right\}. \quad (16)$$

The real and imaginary parts of $\Gamma_L$ are defined as $\Gamma_R$ and $\Gamma_I$, respectively. Inserting the definitions of $\alpha$ and $\beta$ in terms of $\hat{W}_L$ and $X_{L-1}$ and doing some algebra:

$$\frac{d\mathcal{L}}{d\varepsilon_L} = \mathcal{R}\left\{\left(\Gamma_R \odot \frac{du}{d\alpha}\right)^T \frac{d\hat{W}_L}{d\varepsilon_L} X_{L-1} \quad (17)$$

$$-\left(\Gamma_I \odot \frac{dv}{d\alpha}\right)^T \frac{d\hat{W}_L}{d\varepsilon_L} X_{L-1} \quad (18)$$

$$-i\left(\Gamma_R \odot \frac{du}{d\beta}\right)^T \frac{d\hat{W}_L}{d\varepsilon_L} X_{L-1} \quad (19)$$

$$+i\left(\Gamma_I \odot \frac{dv}{d\beta}\right)^T \frac{d\hat{W}_L}{d\varepsilon_L} X_{L-1}\right\}. \quad (20)$$

Finally, the expression simplifies to $$\frac{d\mathcal{L}}{d\varepsilon_L} = \mathcal{R}\left\{\left[\Gamma_R \odot \left(\frac{du}{d\alpha} - i\frac{du}{d\beta}\right)\right. \quad (21)$$

$$\left.+\Gamma_I \odot \left(\frac{dv}{d\alpha} + i\frac{dv}{d\beta}\right)\right]^T \frac{d\hat{W}_L}{d\varepsilon_L} X_{L-1}\right\}. \quad (22)$$

As a check, if the conditions for $f_L(Z)$ to be holomorphic are set, namely $$\frac{du}{d\alpha} = \frac{dv}{d\beta}, \text{ and } \frac{du}{d\beta} = -\frac{dv}{d\alpha}, \quad (23)$$

Eq. (20) simplifies to $$\frac{d\mathcal{L}}{d\varepsilon_L} = \mathcal{R}\left\{\left[\Gamma_R \odot \left(\frac{du}{d\alpha} + i\frac{dv}{d\alpha}\right) + \quad (24)\right.\right.$$

$$\left.\Gamma_I \odot \left(-\frac{dv}{d\alpha} + i\frac{dv}{d\alpha}\right)\right]^T \frac{d\hat{W}_L}{d\varepsilon_L} X_{L-1}\right\} \quad (25)$$

$$= \mathcal{R}\left\{\left[\Gamma_L \odot \left(\frac{du}{d\alpha} + i\frac{dv}{d\alpha}\right)\right]^T \frac{d\hat{W}_L}{d\varepsilon_L} X_{L-1}\right\} \quad (26)$$

$$= \mathcal{R}\left\{[\Gamma_L \odot f_l'(Z_L)]^T \frac{d\hat{W}_L}{d\varepsilon_L} X_{L-1}\right\} \quad (27)$$

$$= \mathcal{R}\left\{\delta_L^T \frac{d\hat{W}_L}{d\varepsilon_L} X_{L-1}\right\} \quad (28)$$

as before.

This derivation may be similarly extended to any layer l in the network. For holomorphic activation functions, whereas the $\delta$ vectors were defined as $$\delta_l = \Gamma_l \odot f_l'(Z_l), \quad (29)$$

for non-holomorphic activation functions, the respective definition is $$\delta_L = \Gamma_R \odot \left(\frac{du}{d\alpha} - i\frac{du}{d\beta}\right) + \Gamma_I \odot \left(-\frac{du}{d\alpha} + i\frac{dv}{d\beta}\right), \quad (30)$$

where $\Gamma_R$ and $\Gamma_I$ are the respective real and imaginary parts of $\Gamma_l$, u and v are the real and imaginary parts of $f_l(\cdot)$, and $\alpha$ and $\beta$ are the real and imaginary parts of $Z_l$, respectively.

This can be written more simply as $$\delta_l = \mathcal{R}\left\{\Gamma_l \odot \frac{df}{d\alpha}\right\} - i\mathcal{R}\left\{\Gamma_l \odot \frac{df}{d\beta}\right\}. \quad (31)$$

In polar coordinates where $Z = r\exp(i\phi)$ and $f = f(r, \phi)$, this equation becomes $$\delta_l = \exp(-i\phi)\left(\mathcal{R}\left\{\Gamma_l \odot \frac{df}{dr}\right\} - i\mathcal{R}\left\{\Gamma_l \odot \frac{1}{r}\frac{df}{d\phi}\right\}\right), \quad (32)$$

where all operations are element-wise.

Gradient Computation

Computing gradient terms of the form $$\mathcal{R}\left\{\delta_l^T \frac{d\hat{W}_l}{d\varepsilon_l} X_{l-1}\right\},$$

which contain derivatives with respect to permittivity of the phase shifters in the OIUs, can be a crucial step in training an ANN. In certain embodiments, gradients can be expressed as the solution to an electromagnetic adjoint problem.

OIUs used to implement the matrix $\hat{W}_l$, relating the complex mode amplitudes of input and output ports, can be described using first-principles electrodynamics. This can allow for the gradient to be computed with respect to each $\varepsilon_l$, as these are the physically adjustable parameters in the system in accordance with some embodiments of the invention. Assuming a source at frequency $\omega$, at steady state, Maxwell's equations take the form $$[\hat{\nabla} \times \hat{\nabla} \times -k_0^2 \varepsilon_r]e = -i\omega\mu_0 j, \qquad (33)$$

which can be written more succinctly as $$\hat{A}(\varepsilon_r)e = b. \qquad (34)$$

Here, $\hat{\varepsilon}_r$ describes the spatial distribution of the relative permittivity ($\varepsilon_r$), $k_0 = \omega^2/c^2$ is the free-space wavenumber, e is the electric field distribution, j is the electric current density, and $\hat{A} = \hat{A}^T$ due to Lorentz reciprocity. Eq. (34) is the starting point of the finite-difference frequency-domain (FDFD) simulation technique, where it is discretized on a spatial grid, and the electric field e is solved given a particular permittivity distribution, $\varepsilon_r$, and source, b.

To relate this formulation to the transfer matrix $\hat{W}$, source terms $b_i$, $i \in 1 \ldots 2N$ can be defined, which correspond to a source placed in one of the input or output ports. In this example, it is assumed that there are a total of N input and N output waveguides. The spatial distribution of the source term, $b_i$, matches the mode of the i-th single-mode waveguide. Thus, the electric field amplitude in port i is given by $b_i^T e$, and a relationship can be established between e and $X_{in}$, as $$X_{in,i} = b_i^T e \qquad (35)$$

for $i=1 \ldots N$ over the input port indices, where $X_{in,l}$ is the i-th component of $X_{in}$. Or more compactly, $$X_{in} = \hat{P}_{in} e, \qquad (36)$$

Similarly, $$Z_{out,i} = b_{i+N}^T e \qquad (37)$$

for $i+N=(N+1) \ldots 2N$ over the output port indices, or, $$Z_{oout} = \hat{P}_{out} e, \qquad (38)$$

and, with this notation, Eq. (1) becomes $$\hat{W}\hat{P}_{in}e = \hat{P}_{out}e \qquad (39)$$

Based on the above, the cost function gradient in Eq. (10) can be evaluated. In particular, Eqs. (34) and (39), $$\frac{d\mathcal{L}}{d\varepsilon_l} = -\mathcal{R}\left\{\delta_l^T \hat{P}_{out} \hat{A}^{-1} \frac{d\hat{A}}{d\varepsilon_l} \hat{A}^{-1} b_{x,l-1}\right\}. \qquad (40)$$

Here $b_{x,l-1}$ is the modal source profile that creates the input field amplitudes $X_{l-1}$ at the input ports.

The key insight of the adjoint variable method is that the expression can be interpreted as an operation involving the field solutions of two electromagnetic simulations, which can be referred to as the 'original' (og) and the 'adjoint' (aj)

$$\hat{A}e_{og} = b_{x,l-1} \qquad (41)$$

$$\hat{A}e_{aj} = \hat{P}_{out}^T \delta_l \qquad (42)$$

using the symmetric property of $\hat{A}$.

Eq. (40) can now be expressed in a compact form as $$\frac{d\mathcal{L}}{d\varepsilon_l} = -\mathcal{R}\left\{e_{aj}^T \frac{d\hat{A}}{d\varepsilon_l} e_{og}\right\}. \qquad (43)$$

If it is assumed that this phase shifter spans a set of points, $r_\phi$ in the system, then, from Eq. (33).

$$\frac{d\hat{A}}{d\varepsilon_l} = -k_0^2 \sum_{r' \in r_0} \hat{\delta}_{r,r'}, \qquad (44)$$

where $\hat{\delta}_{r,r'}$ is the Kronecker delta.

Inserting this into Eq. (43), the gradient is given by the overlap of the two fields over the phase-shifter positions $$\frac{d\mathcal{L}}{d\varepsilon_l} = k_0^2 \mathcal{R}\left\{\sum_{r \in r_o} e_{aj}(r) e_{og}(r)\right\}. \qquad (45)$$

Figure 3:
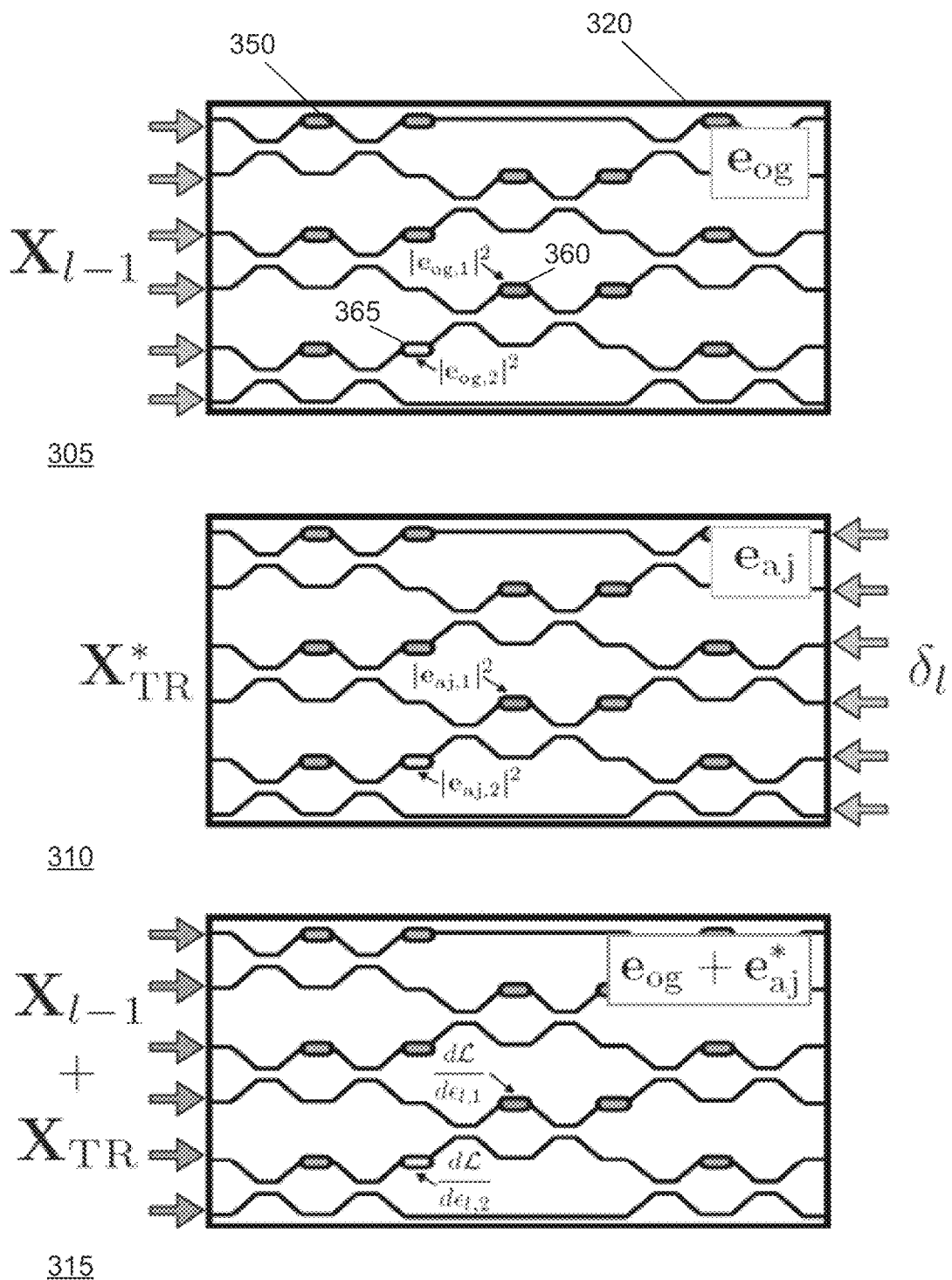
FIG. 3 illustrates a schematic of a process for experimental measurement of gradient information.

A schematic illustration of methods in accordance with many embodiments of the invention for experimental measurement of gradient information is illustrated in three stages 305-315 in FIG. 3. The box region 320 represents the OIU. The ovals (e.g., 350) represent tunable phase shifters. Computation of the gradient is illustrated with respect to phase shifters 360 and 365.

In the first stage 305, the original set of amplitudes $X_l$ is sent through the OIU 3 2. The constant intensity terms is measured at each phase shifter. The second stage 310 shows that the adjoint mode amplitudes, given by $\delta_l$, are sent through the output side of the OIU. $X_{TR}^*$ is recorded from the opposite side, as well as $|e_{aj}|^2$ in each phase-shifter. In the third stage, $X_l + X_{TR}$ is sent through the OIU, interfering $e_{og}$ and $e_{aj}^*$ inside the device and recovering the gradient information for all phase shifters simultaneously.

Methods in accordance with numerous embodiments of the invention compute the gradient from the previous section through in situ intensity measurements. Specifically, an intensity pattern is generated with the form $\mathcal{R}\{e_{og}e_{aj}\}$, matching that of Eq. (45). Interfering $e_{og}$ s and $e_{aj}^*$ directly in the system results in the intensity pattern:

$$I = |e_{og}|^2 + |e_{aj}|^2 + 2\mathcal{R}\{e_{og}e_{aj}\}. \qquad (46)$$

the last term of which matches Eq. (45). Thus, in many embodiments, the gradient can be computed purely through intensity measurements if the field $e_{aj}^*$ can be generated in the OIU.

The adjoint field, $e_{aj}$, as defined in Eq. (42), is sourced by $\hat{P}_{out}^T \delta_l$, meaning that it physically corresponds to a mode sent into the system from the output ports. As complex conjugation in the frequency domain corresponds to time-reversal of the fields, $e_{aj}^*$ is expected to be sent in from the input ports. Formally, to generate $e_{aj}^*$, a set of input source amplitudes, $X_{TR}$, is found such that the output port source amplitudes, $Z_{TR} = \hat{W} X_{TR}$, are equal to the complex conjugate of the adjoint amplitudes, or $\delta_l^*$. Using the unitarity property of transfer matrix $\hat{W}_l$ for a lossless system, along with the fact that $\hat{P}_{out} \hat{P}_{out}^T = 1$ for output modes, the input mode amplitudes for the time-reversed adjoint can be computed as $$X_{TR}^* = \hat{W}_l^T \delta_l. \tag{47}$$

As discussed earlier, $\hat{W}_l^T$ is the transfer matrix from output ports to input ports. Thus, $X_{TR}$ can be experimentally determined by sending $\delta_l$ into the device output ports, measuring the output at the input ports, and taking the complex conjugate of the result.

Figure 4:
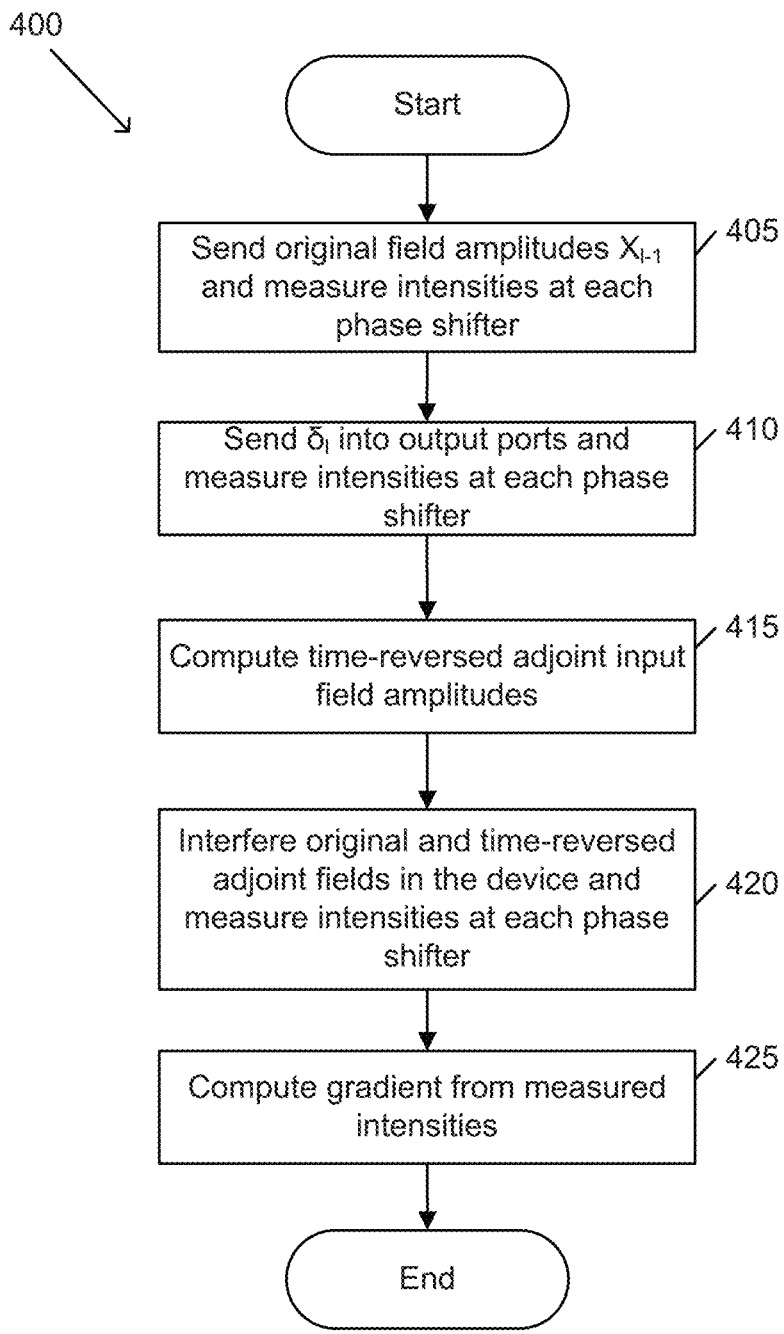
FIG. 4 conceptually illustrates a process for experimental measurement of gradient information.

A process 400 for experimentally measuring a gradient of an OIU layer in an ANN with respect to the permittivities of the OIU layer's integrated phase shifters is conceptually illustrated in FIG. 4. Process 400 sends (405) original field amplitudes $X_{l-1}$ through the OIU layer and measures the intensities at each phase shifter. Process 400 sends (410) $\delta_l$ into the output ports of the OIU layer and measures the intensities at each phase shifter. Process 400 computes (415) the time-reversed adjoint input field amplitudes. In numerous embodiments, time-reversed adjoint input field amplitudes are calculated as in Eq. (47). Process 400 interferes (420) the original and time-reversed adjoint fields in the device and measures the resulting intensities at each phase shifter. Process 400 computes (425) a gradient from the measured intensities. In a number of embodiments, processes compute gradients by subtracting constant intensity terms measured from the original field amplitudes and $\delta_l$ (e.g., at steps 405 and 410 of process 400) and multiply by $k_0^2$ to recover the gradient, as in Eq. (45).

In many embodiments, the isolated forward and adjoint steps are performed separately, storing the intensities at each phase shifter for each step, and then subtracting this information from the final interference intensity. In a variety of embodiments, rather than storing these constant intensities, processes can introduce a low-frequency modulation on top of one of the two interfering fields, such that the product term of Eq. (46) can be directly measured from the low-frequency signal.

Specific processes for experimentally measuring a gradient of an OIU layer in an ANN in accordance with embodiments of the invention are described above; however, one skilled in the art will recognize that any number of processes can be utilized as appropriate to the requirements of specific applications in accordance with embodiments of the invention.

Figure 5:
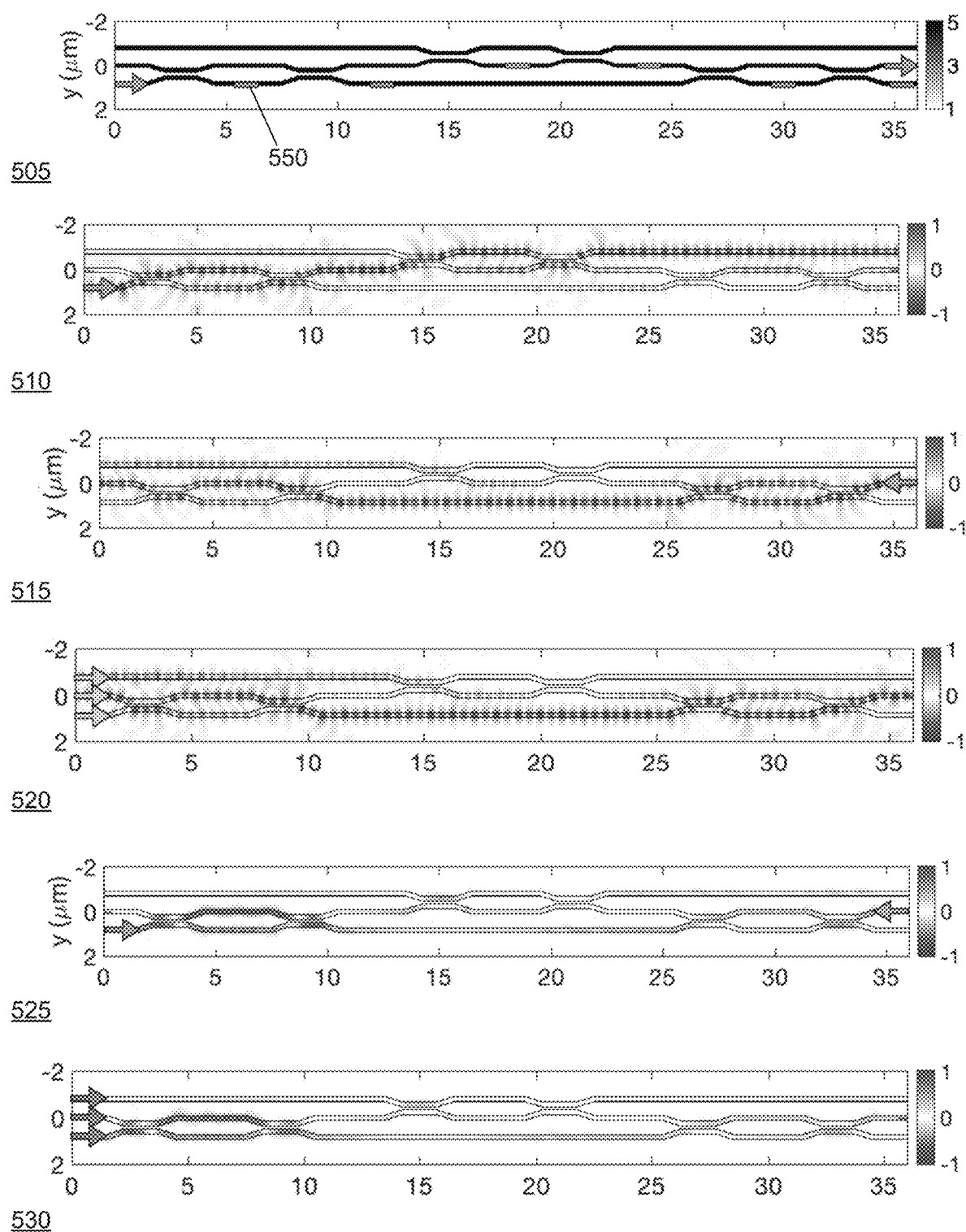
FIG. 5 illustrates a numerical demonstration of a time-reversal procedure.

A numerical demonstration of a time-reversal procedure is illustrated in five panels 505-530 of FIG. 5. In this example, the procedure is performed with a series of FDFD simulations of an OIU implementing a 3×3 unitary matrix. These simulations are intended to represent the gradient computation corresponding to one OIU in a single layer, l, of a neural network with input $X_{l-1}$ and delta vector $\delta_l$. In these simulations, absorbing boundary conditions are used on the outer edges of the system to eliminate back-reflections.

The first panel 505 shows a relative permittivity distribution for three MZIs arranged to perform a 3×3 linear operation. Boxes (e.g., 550) represent where variable phase shifters could be placed in this system. As an example, the gradient information for a layer with $X_{l-1} = [0\ 0\ 1]^T$ with unit amplitude and $\delta_l = [0\ 1\ 0]^T$ is computed, corresponding to the bottom left and middle right ports, respectively.

The second panel 510 illustrates the real part of a simulated electric field $E_z$ corresponding to injection from the bottom left port. Specifically, stage 510 shows the real part of $e_{og}$, corresponding to the original, forward field.

In the third panel 515, the real part of the adjoint $E_z$ is shown, corresponding to injection from the middle right port. The third 515 shows the real part of the adjoint field, $e_{aj}$, corresponding to the cost function $\mathcal{L} = \mathcal{R}\{\delta_l^T \hat{W}_l X_{l-1}\}$.

The fourth panel 520 shows a time-reversed adjoint field in accordance with some embodiments of the invention that can be fed in through all three ports on the left. Panel 520 shows the real part of the time-reversed copy of $e_{aj}$ as computed by the method described in the previous section, in which $X_{TR}^*$ is sent in through the input ports. There is excellent agreement, up to a constant, between the complex conjugate of the field pattern of panel 515 and the field pattern of panel 520.

The fifth panel 525 shows gradient information $$\frac{d\mathcal{L}}{d\varepsilon_l}(x, y)$$

as obtained directly by the adjoint method, normalized by its maximum absolute value. Panel 525 shows the gradient of the objective function with respect to the permittivity of each point of space in the system, as computed with the adjoint method, described in Eq. (45).

In the sixth panel 530, the gradient information as obtained by methods in accordance with a variety of embodiments of the invention is shown, normalized by its maximum absolute value. Namely, the field pattern from panel 510 is interfered with the time-reversed adjoint field of panel 520 and the constant intensity terms are subtracted from the resulting intensity pattern. In certain embodiments, the results are then multiplied by an appropriate set of constants. Panels 525 and 530 match with high precision.

In a realistic system, the gradient must be constant for any stretch of waveguide between waveguide couplers because the interfering fields are at the same frequency and are traveling in the same direction. Thus, there should be no distance dependence in the corresponding intensity distribution. This is largely observed in this simulation, although small fluctuations are visible because of the proximity of the waveguides and the sharp bends, which were needed to make the structure compact enough for simulation within a reasonable time. In practice, the importance of this constant intensity is that it can be detected after each phase shifter, instead of inside of it. Intensity measurements in accordance with some embodiments of the invention can occur in the waveguide regions directly after the phase shifters, which eliminates the need for phase shifter and photo-detector components at the same location.

Numerically generated systems in accordance with many embodiments of the invention experience a power transmission of only 59% due to radiative losses and backscattering caused by very sharp bends and stair-casing of the structure in the simulation. Nevertheless, the time-reversal interference procedure still reconstructs the adjoint sensitivity with very good fidelity. Furthermore, a reasonable amount of this loss is non-uniform due to the asymmetry of the structure.

Choice and Implementation of Activation Functions

A major drawback of saturable absorption is that it is fundamentally lossy. Depending on the threshold power and waveguide implementation, an attenuation per layer of at least 1 dB can be expected. In a large scale photonic ANN with many layers, the compounding attenuation from each layer can bring the signal levels below the optical noise floor. Moreover, this scheme may require lowered activation power thresholds for successively deeper layers, which can be challenging to achieve for a fixed hardware platform and saturable absorption mechanism.

It is therefore of substantial interest to develop activation functions that are not subjected to the above limitations. Additionally, for simple implementation of the backpropagation algorithm described in this work, activation functions in accordance with various embodiments of the invention can have derivatives that allow the operation $\delta_l = \Gamma_l \odot f'(Z_l)$ to be performed simply in the photonic circuit.

A possible alternative to saturable absorption is the rectified linear unit (ReLU) activation, which is a common activation function in conventional real-valued ANNs with several complex-valued variants. For example, the complex ReLU (c-ReLU) variant returns the output only if it is above a power threshold. This function is convenient because it is holomorphic (away from the discontinuity) and its derivative is simply 0 below the power threshold and 1 above the power threshold. Therefore, forward and backward propagation steps can be performed on the same hardware. For forward propagation, one would first measure the power of the waveguide mode with an electro-optic circuit and close the channel if it is below a threshold. For backward propagation, simply leave this channel either closed or open, depending on the forward pass.

The mod-ReLU variant similarly first checks whether the input is above a power threshold. If not, 0 is returned. Otherwise, it returns the input but with the power threshold subtracted from its amplitude.

Specific activation functions in accordance with embodiments of the invention are described above; however, one skilled in the art will recognize that any number of activation functions can be utilized as appropriate to the requirements of specific applications in accordance with embodiments of the invention.

Avoiding Internal Coherent Detection and Reconstruction

As presented thus far, the time-reversal interference method requires coherent detection and state preparation inside of the device. This introduces potential technical challenges and the need for additional components within the device. To mitigate this issue, methods in accordance with some embodiments of the invention (also referred to as a 'linearization methods') can recover gradient information without needing coherent detection within the device. In a variety of embodiments, methods can allow one to work entirely on the outsides of the ANN by selectively turning off or 'linearizing' the activation functions between layers in a controlled fashion. However, such methods can require an activation that may implement backpropagation through some protocol that, itself, does not require internal coherent measurement and state preparation.

Figure 6:
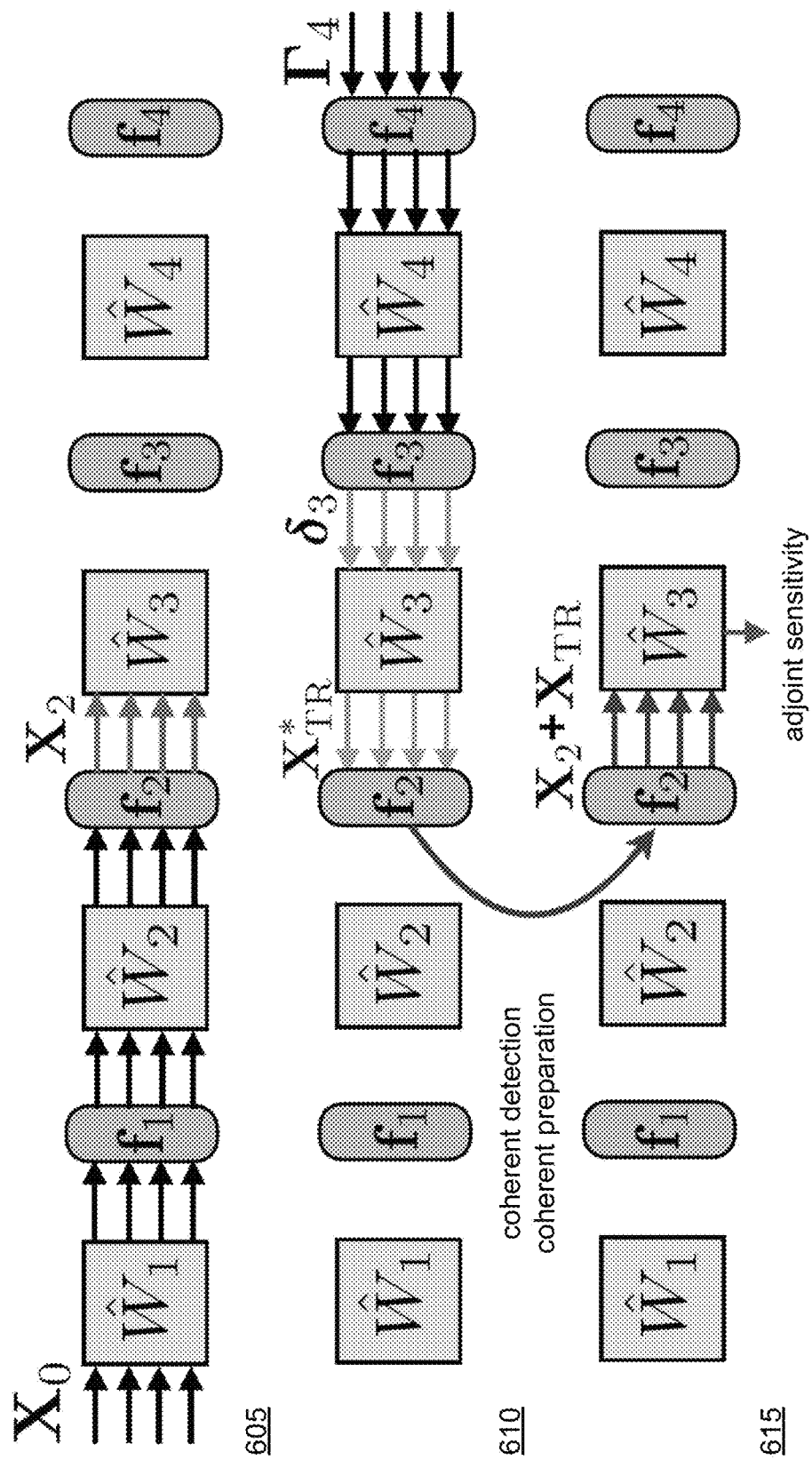
FIG. 6 illustrates how a time-reversal interference technique could be performed for a layer embedded in a network.

A time-reversal interference method for a single linear OIU embedded in the network is described above. As described, time-reversal interference methods can require coherent detection to obtain $X_{TR}^*$, external computation of $X_{TR}$, and subsequent coherent preparation of $X_{TR}$ in the device. Thus, implementing this in a multi-layered network could require additional elements between each layer, complicating the experimental setup. An example of such a time-reversal interference technique for a layer embedded in a network is illustrated in FIG. 6. In this example, coherent detection, external computation, and state preparation is required between layers 610 and 615, which can be undesirable.

To overcome this issue, methods in accordance with various embodiments of the invention can obtain the sensitivity of the internal layers without needing coherent detection or preparation within the network. The strategy relies on the ability to 'linearize' the activations, such that they become represented as simple transmission for both forward and backward passes. For a linearized activation given by $f_l(Z_l) = Z_l$, $Z_l = X_l$ and $\delta_l = \Gamma_l$, which greatly simplifies both forward and backward propagation.

Figure 7:
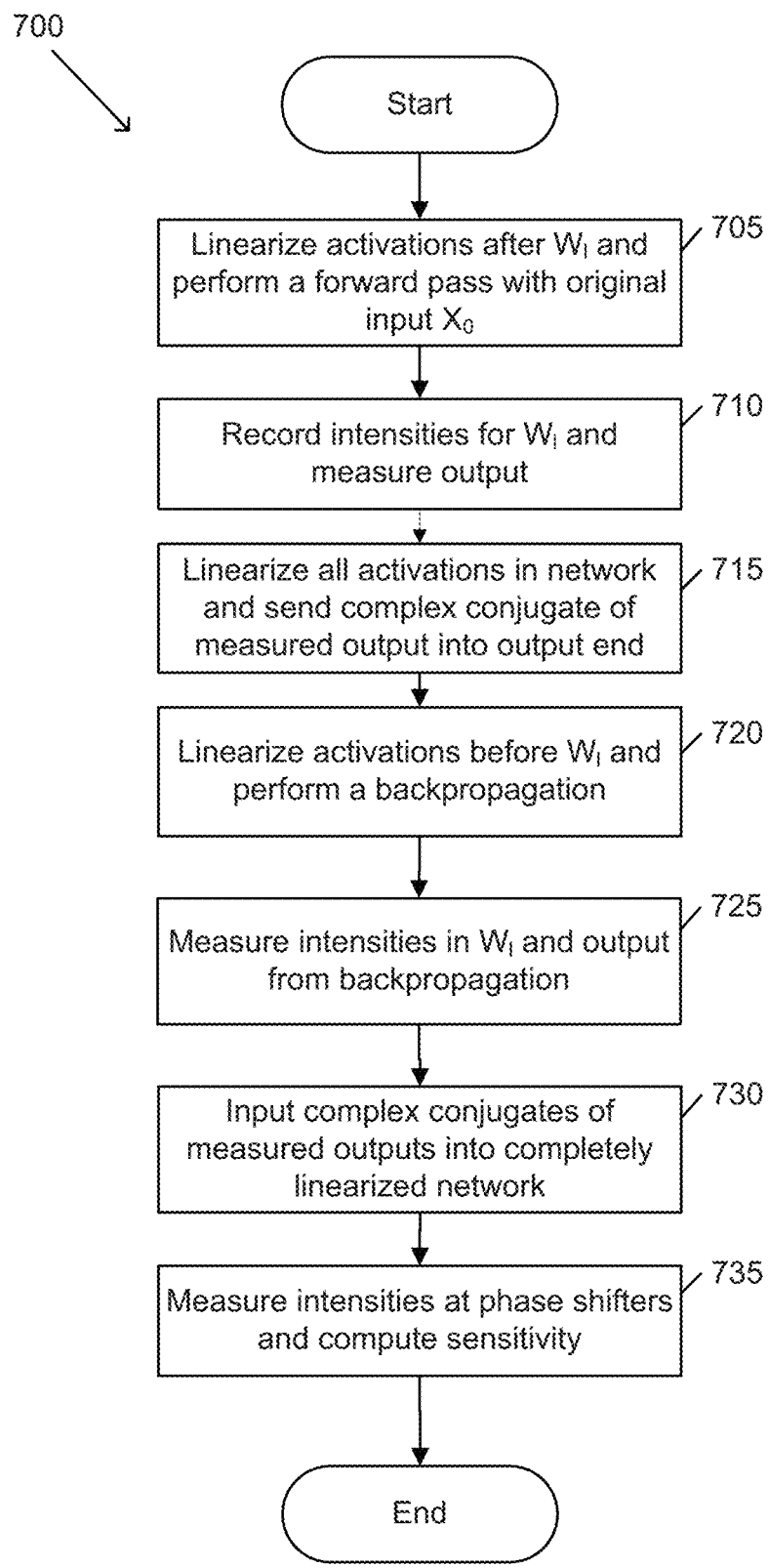
FIG. 7 conceptually illustrates a process for using a time-reversal inference method to measure sensitivities.

A process for tuning a linear layer $\hat{W}_l$ is conceptually illustrated in FIG. 7. Process 700 linearizes (705) all activations after $\hat{W}_l$ and performs a forward pass with original input $X_0$. Process 700 records (710) intensities within $\hat{W}_l$ and measures theoutput. Process 700 linearizes (715) all activations in network and sends the complex conjugate of the measured output into the output end of network and measures output b. Sending b* into the input end of the network recreates the desired $X_{l-1}$ at the input of $\hat{W}_l$. Process 700 linearizes (720) all activations in network before $\hat{W}_l$ and performs backpropagation, sending $\Gamma_L$ into the output end of network. Process 700 measures (725) intensities in $\hat{W}_l$ for subtraction and the output e. Sending e* into the input end of the network recreates the desired $X_{TR}$ at the input end of $\hat{W}_l$ and $\delta_l^*$ at the output end of $\hat{W}_l$. Process 700 inputs (730) b*+e* into completely linearized network, which reproduces the desired interference term $X_2 + X_{TR}$ at the input end of $\hat{W}_l$. Process 700 measures (735) the intensities in $\hat{W}_l$ and computes sensitivity. Methods for computing the sensitivity based on the measured intensities are described in greater detail above.

By linearizing the activation functions, large sections of the network can be made unitary. This allows the encoding of information about the internal fields in the externally measured states a, b, c. These states can be used to recreate the desired interference terms needed to obtain gradients as intensity measurements.

In numerous embodiments, methods in accordance with several embodiments of the invention can be used in a general network. In order to compute gradients for layer l of L, each OIU can be described by a matrix $\hat{W}_l$ and each activation can be described by a $\hat{F}_l$ operator in the forward propagation and $\hat{B}_l$ in the backward propagation. Note that even though the activations are nonlinear, depending on the result of a forward pass through the network, they can be set and then may resemble linear operations.

For the time-reversal interference method to work, an input to the system can be produced such that the mode $X_l + X_{TR}$ is created right before $\hat{W}_l$. Equivalently, the state $Z_l + \delta_l^*$ can be produced directly after $\hat{W}_l$. Using the notation introduced, these states can be explicitly described as $$Z_l = \hat{W}_l(\hat{F}_{l-1}\hat{W}_{l-1} \ldots \hat{F}_1 \hat{W}_1)X_0 \qquad (48)$$

$$\delta_l = (\hat{W}_{l-1}^T \hat{B}_{l-1} \ldots \hat{W}_L^T \hat{B}_L)\Gamma_L \qquad (49)$$

Figure 8:
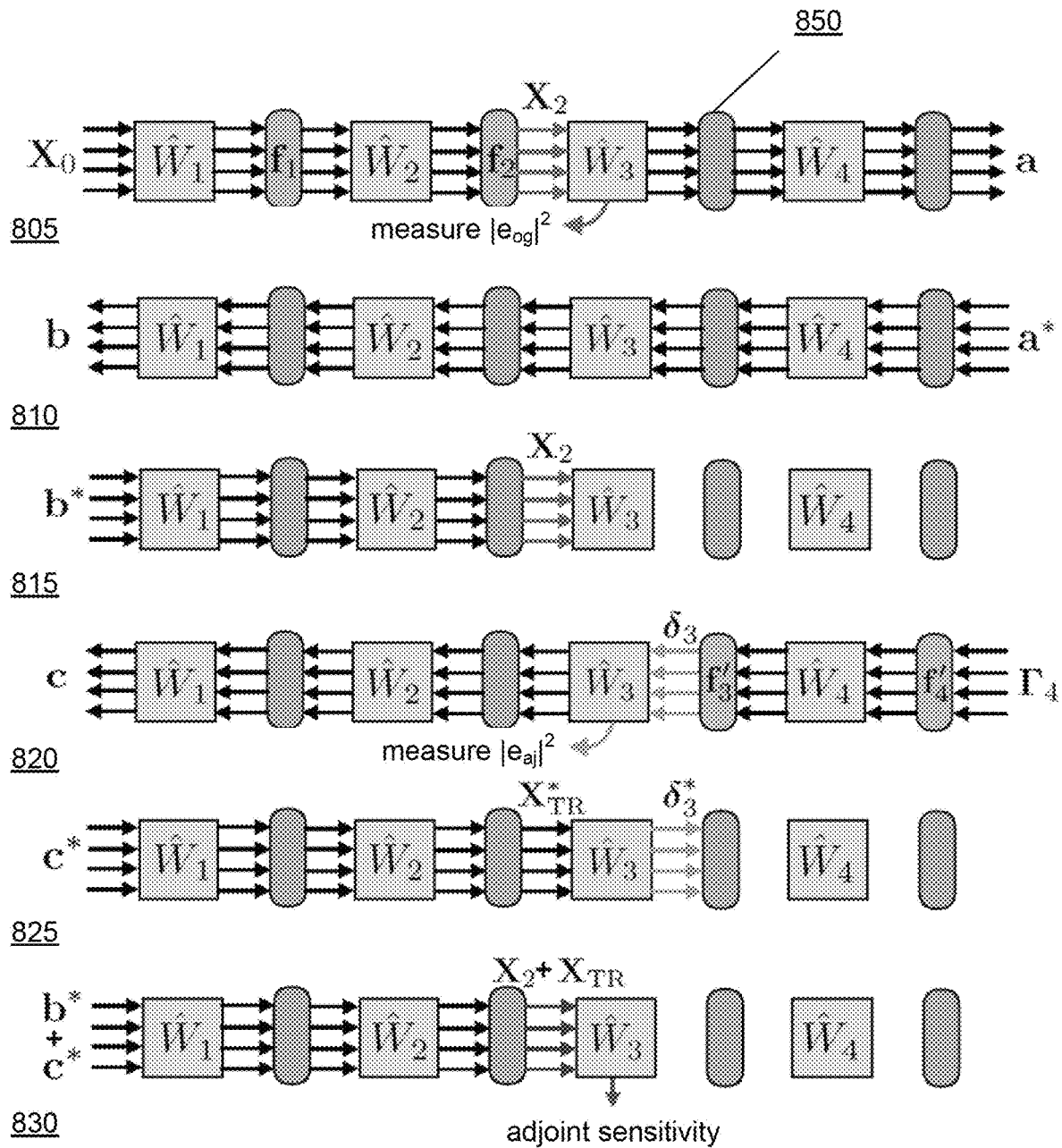
FIG. 8 illustrates how a time-reversal inference technique can be applied without internal coherent detection and preparation.

A stage diagram of a procedure for using the time-reversal interference method to measure sensitivities in the OIUs without internal coherent detection or preparation is illustrated in six stages 805-830 of FIG. 8. In the first stage 805, the gradient measurement with respect to the phase shifters is shown in the l=3 layer, which requires creating an input state to recreate $X_2 + X_{TR}$ at the input of $\hat{W}_3$. Empty ovals 850 correspond to 'linearized' activations, which can be represented as an identity matrix. The first stage 805 shows all of the channels following layer 1 are linearized. The output of the system when sending in the original input, $X_0$, is computed, which is labeled a.

$$a = (\hat{W}_L \ldots \hat{W}_l)(\hat{F}_{l-1}\hat{W}_{l-1} \ldots \hat{F}_1\hat{W}_1)X_0. \qquad (51)$$

The second stage 810 shows that all of the activation channels are linearized. Then, a* is sent into the output end of the network and the output is measured, which is labeled b.

$$b = (\hat{W}_l^T \ldots \hat{W}_L^T) a^* \tag{52}$$

The complex conjugate of b is given by $$b^* = (\hat{W}_l^\dagger \ldots \hat{W}_L^\dagger) a \tag{53}$$

$$= (\hat{W}_l^\dagger \ldots \hat{W}_L^\dagger)(\hat{W}_L \ldots \hat{W}_l)(\hat{F}_{l-1}\hat{W}_{l-1} \ldots \hat{F}_l\hat{W}_l) X_0 \tag{54}$$

$$= (\hat{W}_l^\dagger \ldots \hat{W}_{l-1}^\dagger)(\hat{F}_{l-1}\hat{W}_{l-1} \ldots \hat{F}_l\hat{W}_l) X_0. \tag{55}$$

The third stage 815 shows that sending b* into the input end of the network recreates the desired $X_{l-1}$ at the input of $\hat{W}_l$. In the fourth stage 820, only the activation channels before layer l are linearized and $\Gamma_L$ is input into the output end of the system, measuring c.

$$c = (\hat{W}_l^T \ldots \hat{W}_l^T)(\hat{W}_{l+1}^T \hat{B}_{l+1} \ldots \hat{W}_L^T \hat{B}_L) \Gamma_L \tag{56}$$

$$c^* = (\hat{W}_l^\dagger \ldots \hat{W}_l^\dagger)(\hat{W}_{l+1}^\dagger \hat{B}_{l+1}^* \ldots \hat{W}_L^\dagger \hat{B}_L^*) \Gamma_L^* \tag{57}$$

The fifth stage 825 shows that sending c* into the input end of the network recreates the desired $X_{TR}$ at the input end of $\hat{W}_l$ and $\delta_l^*$ at the output end of $\hat{W}_l$. The sixth stage 830 shows that inputting b*+c* will output $Z_l + \delta_l^*$ directly after layer l, which will be sufficient for training via the time-reversal intensity measurement technique. To make the derivation more clear, these two terms are split up and the total output is defined as $o \equiv o_1 + o_2$ where $$o \equiv (\hat{W}_{l-1} \ldots \hat{W}_l)(b^* + c^*) \tag{58}$$

$$o_1 \equiv (\hat{W}_{l-1} \ldots \hat{W}_l) b^* \tag{59}$$

$$o_2 \equiv (\hat{W}_{l-1} \ldots \hat{W}_l) c^* \tag{60}$$

Inserting the form of b* from Eq. (55) into the expression for $o_1$, $$o_1 = (\hat{W}_l \ldots \hat{W}_l)(\hat{W}_l^\dagger \ldots \hat{W}_{l-1}^\dagger)(\hat{F}_{l-1}\hat{W}_{l-1} \ldots \hat{F}_l\hat{W}_l) X_0 \tag{61}$$

$$= \hat{W}_l (\hat{F}_{l-1}\hat{W}_{l-1} \ldots \hat{F}_l\hat{W}_l) X_0 \tag{62}$$

$$= \hat{W}_l X_l \tag{63}$$

$$= Z_l \tag{64}$$

as desired. Similarly, inserting the form of e* from Eq. (57) into the expression for $o_2$, $$o_2 = (\hat{W}_l \ldots \hat{W}_l)(\hat{W}_l^\dagger \ldots \hat{W}_l^\dagger)(\hat{W}_{l+1}^\dagger \hat{B}_{l+1}^* \ldots \hat{W}_L^\dagger \hat{B}_L^*) \Gamma_L^* \tag{65}$$

$$= (\hat{W}_{l+1}^\dagger \hat{B}_{l+1}^* \ldots \hat{W}_L^\dagger \hat{B}_L^*) \Gamma_L^* \tag{66}$$

$$= \delta_l^* \tag{67}$$

also as desired.

Thus, inputing b*+c* will give $o = Z_l + \delta_l^*$ at the output of layer l. Equivalently, this same input reproduces $X_{l-1} + X_{TR}$ at the input end of later l, which is what we need to do time-reversal sensitivity measurements. The derivation presented here holds for an arbitrary choice of activation function, even those not representable by a linear operator.

Other Applications

Figure 9:
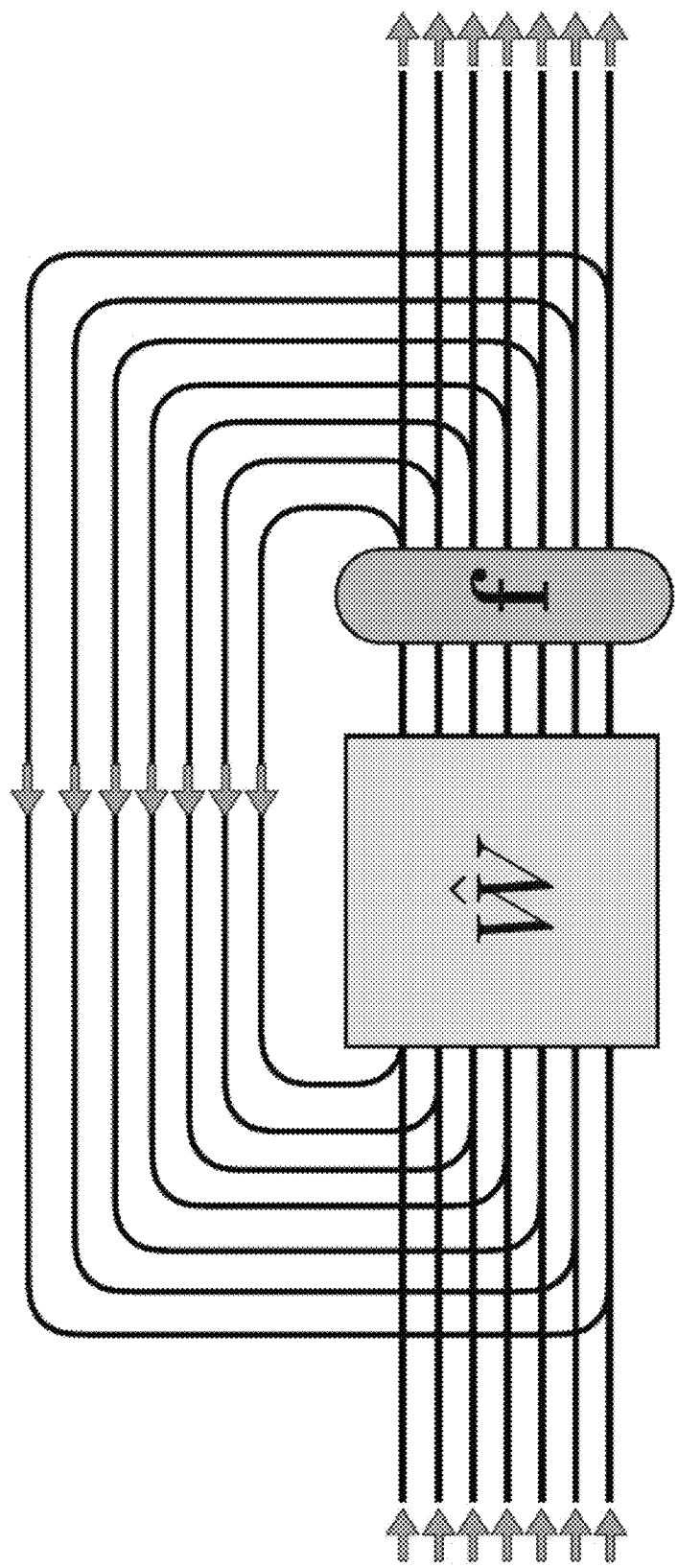
FIG. 9 illustrates a schematic of are current neural network (RNN).

In addition to the feed-forward ANNs discussed in this work, methods in accordance with some embodiments of the invention can be used to train recurrent neural networks (RNNs), which are commonly used to analyze sequential data, such natural language or time series inputs. Recurrent networks, as diagrammed in FIG. 9, have a single linear layer and activation function. A schematic of are current neural network (RNN) is illustrated in FIG. 9 with a single OIU and activation function. A time series of inputs to the system are provided from the left. The output of this layer may be read out with a portion routed back into the input end of the network. In many embodiments, this splitting and routing may be done simply in the photonic platform using an integrated beam splitter. RNNs may also be trained using the same backpropagation method as described above.

Methods in accordance with several embodiments of the invention can be used to train Convolutional Neural Networks (CNNs). CNNs are another popular class of neural network that is commonly used to analyze image data, where there are many inputs with a large amount of corre-lation between adjacent elements. In CNNs, the matrix multiplications are replaced by convolution operations between the input values and a trainable kernel. This convolution may be performed on a mesh of MZIs similar to those presented here, but with far fewer MZI units necessary. In various embodiments, backpropagation for CNNs may be performed using methods as described above.

The training scheme presented here can also be used to tune a single OIU without non-linearity, which may find a variety of applications. Specifically, the linear unit can be trained to map a set of input vectors $\{X_i\}$ to a corresponding set of output vectors $\{Y_i\}$. One example for an objective function for this problem is $$\mathcal{L}(\varphi) = \frac{1}{N} \sum_{i=1}^N \mathcal{R}\{Y_i^\dagger \hat{W} X_i\} \tag{68}$$

where φ is a vector containing all the degrees of freedom. Other choices that also maximize the overlap between $X_i$ and $Y_i$ for every i are, of course, also possible.

One application of this training is a mode sorter for sorting out a number of arbitrary, orthogonal modes. In particular, for an N×N linear system, N orthogonal inputs $X_i$ can be chosen. Define $Y_i = B_i$ as the unit vector for the i-th output port. While this specific problem may also be solved sequentially by existing methods, gradient-based implementations in accordance with some embodiments of the invention may have benefits in speed and scaling with number of parameters in the system, especially when the degrees of freedom can be updated in parallel.

Training protocols in accordance with numerous embodiments of the invention may also be used for optimizing a single (potentially random) input into a desired output. i.e., $\mathcal{L} = \mathcal{R}\{\delta^\dagger \hat{W} X\}$. This type of problem arises for example when considering optical control systems for tuning the power delivery system for dielectric laser accelerators. In this application, a series of waveguides carry power to a central accelerator structure. However, it is likely that these signals will initially consist of randomly distributed powers and phases due to the coupling, splitting, and transport stages earlier in the process. Thus, the OIUs can be used as a phase and amplitude sorting element, where now X is an initially random amplitude and phase in each waveguide, and δ is a vector of target amplitudes and phases for optimal delivery to the dielectric laser accelerator. The adjoint field is directly given by the radiation from an electron beam, so the target vector may be generated physically by sending in a test electron beam. In several embodiments, a similar system can be used for electron beam focusing and bunching applications.

In numerous embodiments, OIUs can also be used to implement reconfigurable optical quantum computations, with various applications in quantum information processing. In such systems, linear training with classical coherent light can be used to configure the quantum gates, e.g., by setting up a specific matrix $\hat{W}$ described by complete, orthonormal sets $\{X_i\}$ and $\{Y_i\}$. After the tuning, systems in accordance with numerous embodiments of the invention can be run in the quantum photonic regime.

Methods in accordance with numerous embodiments of the invention work by physically propagating an adjoint field and interfering its time-reversed copy with the original field. In a number of embodiments, the gradient information can then be directly obtained out as an in-situ intensity measurement. While processes are described in the context of ANNs, one skilled in the art will recognize that the processes are broadly applicable to any reconfigurable photonic system. Such a setup can be used to tune phased arrays, optical delivery systems for dielectric laser accelerators, or other systems that rely on large meshes of integrated optical phase shifters. Methods in accordance with some embodiments of the invention can implement the nonlinear elements of the ANN in the optical domain.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A method for training a set of one or more optical interference units (OIUs) of a photonic artificial neural network (ANN), wherein the method comprises:
    calculating a loss for an original input to the photonic ANN;
    computing an adjoint input based on the calculated loss;
    measuring intensities for a set of one or more phase shifters in the set of OIUs when the computed adjoint input and the original input are interfered with each other within the set of OIUs, wherein the intensities for each phase shifter of the set of phase shifters is measured after the phase shifter;
    computing a gradient from the measured intensities; and
    tuning phase shifters of the OIU based on the computed gradient.

2. The method of claim 1, wherein computing the adjoint input comprises sending the calculated loss through output ports of the ANN.

3. The method of claim 1, wherein the set of OIUs comprise a mesh of controllable Mach-Zehnder interferometers (MZIs) integrated in a silicon photonic circuit.

4. The method of claim 1, wherein computing the adjoint input comprises sending the calculated loss through output ports of the ANN.

5. The method of claim 1, wherein the loss is the result of a mean squared cost function.

6. The method of claim 1, wherein the ANN is a feed-forward ANN.

7. The method of claim 1, wherein the ANN is are current neural network (RNN).

8. The method of claim 1, wherein the ANN further comprises a set of one or more activation units, wherein each OIU performs a linear operation and each activation unit performs a non-linear function on the input.

9. The method of claim 8, wherein computing the adjoint input comprises linearizing at least one activation unit of the set of activation units prior to sending an input through the ANN.

10. The method of claim 8, further comprising performing dropout during training by shutting off channels in the activation units.

11. The method of claim 1, wherein non-linear functions of the ANN are performed using an electronic circuit.

12. The method of claim 1, wherein each OIU of the set of OIUs includes a same number of input ports and output ports.

13. A photonic hardware platform comprising:
    a set of optical interference units (OIUs) for performing a set of linear operations, wherein each OIU of the set of OIUs comprises a set of one or more integrated phase shifters;
    a set of nonlinear activations for performing a set of nonlinear operations;
    a set of input ports; and
    a set of output ports, wherein the photonic hardware platform is configured to:
        interfere an original input and an adjoint input within the set of OIUs, wherein the adjoint input is computed based on a calculated loss for the original input through the photonic hardware;
        measure intensities for the set of OIUs after each integrated phase shifter of the set of integrated phase shifters, based on the interfered inputs; and
        tune the set of OIUs based on a gradient computed from the measured intensities.

14. The photonic hardware platform of claim 13, wherein at least one OIU of the set of OIUs is a mesh of controllable Mach-Zehnder interferometers (MZIs) integrated in a silicon photonic circuit.

15. The photonic hardware platform of claim 13, wherein the photonic hardware platform is further configured to compute the adjoint input by sending a calculated loss through the output ports of the photonic hardware platform.

16. The photonic hardware platform of claim 13, wherein the photonic hardware platform is a feed-forward ANN.

17. The photonic hardware platform of claim 13, wherein the nonlinear operations are performed using an electronic circuit.

* * * * *